(12) United States Patent
Yoshida et al.

(10) Patent No.: US 7,711,870 B2
(45) Date of Patent: May 4, 2010

(54) INTERFACE DETECTING CIRCUIT AND INTERFACE DETECTING METHOD

(75) Inventors: Masato Yoshida, Kanagawa (JP);
Yoshihito Kawakami, Kanagawa (JP);
Shigenori Arai, Kanagawa (JP);
Hideyuki Kihara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 171 days.

(21) Appl. No.: 12/026,730

(22) Filed: Feb. 6, 2008

(65) Prior Publication Data

US 2009/0198841 A1    Aug. 6, 2009

(51) Int. Cl.
*G06F 3/00* (2006.01)
(52) U.S. Cl. .............. 710/16; 710/15; 326/62; 326/80; 326/85; 326/87
(58) Field of Classification Search ............ None
See application file for complete search history.

(56) References Cited

U.S. PATENT DOCUMENTS

| 6,798,173 | B2 * | 9/2004 | Hsu ................ 320/134 |
| 2005/0039060 | A1 | 2/2005 | Okayasu | |
| 2008/0276015 | A1 * | 11/2008 | Kim et al. ............ 710/19 |

FOREIGN PATENT DOCUMENTS

JP    2005-025405    1/2005

OTHER PUBLICATIONS

Annonymous, "Method for a USB Connector to Detect the Disconnection and the Connection of Devices in the S0-S5 States," Feb. 19, 2007, IP.com, pp. 1-3.*
English language Abstract of JP 2005-025405.

* cited by examiner

*Primary Examiner*—Eron J Sorrell
(74) *Attorney, Agent, or Firm*—Greenblum & Bernstein, P.L.C.

(57) ABSTRACT

An interface detecting circuit and interface detecting method are provided, whereby operations can be carried out depending on peripheral devices connected to USB terminals, and whereby the system can be simplified and software load can be reduced. A pull-down resistor is connected to an ID terminal of a Mini-A receptacle of a peripheral device, the voltage generated by the pull-down resistor, which is pulled down by the ID terminal of the Mini-A receptacle of the peripheral device, and a pull-up resistor, which is pulled up by the ID terminal of a Mini-B receptacle of a device, is detected in an analog fashion, using a detecting section comprised of comparators, and, via a logic section, a logic output is subjected to noise cancellation in a filter section and is memorized in a register section. The operations of other devices are determined according to the states memorized in the register section.

11 Claims, 16 Drawing Sheets

INTERFACE DETECTING CIRCUIT AND INTERFACE DETECTING METHOD

BACKGROUND OF THE INVENTION

1. Field of the Invention

The present invention relates to an interface detecting circuit mounted in electronic devices such as mobile devices and an interface detecting method. More particularly, in an interface system, in which a device and the host are connected through a USB (Universal Serial BUS) cable, the present invention relates to an interface detecting circuit and interface detecting method for detecting the type of the host and the connecting state on the device side.

2. Description of the Related Art

The USB has been widely used as a general-purpose interface. The USB is a standard specification, which is standardized by USB-IF (USB Implementers Forum) and a serious bus for connecting host devices such personal computers with peripheral devices such as a mouse and a keyboard. The USB offers features of allowing peripheral devices such as a keyboard, mouse, modem and joy stick to connect with a personal computer through a single interface and making the connection simple utilizing less costly parts.

A well-known USB connector apparatus has a USB plug (Series A Plug) and a USB socket (Series A Receptacle) to connect with the USB plug (Series A Plug).

The USB plug is provided on an end of a cable to connect with a memory medium such as a portable disk, MP3 player and a recording pen and formed by covering a substrate section (which may be referred to as "base section"), in which a plurality of connecting terminals are fixed on the surface thereof covered with a ring-like metallic casing layer.

This substrate section is provided inside the metallic casing layer such that it is in a firm contact with the bottom surface of the casing layer and a connection nipping layer for use in connecting to the USB socket (Series A Receptacle) is possessed between the surface of the substrate section and the top face of the casing layer.

On the other hand, the USB socket, to which the USB plug is to be connected, has a metallic casing which is fitted to the outside of the casing layer of the USB plug and a nipping plate section (projecting plate section) the periphery of which is covered with a casing and which is inserted into the connection nipping layer of the USB plug so that it is nipped between the casing layer and the plate section. Contact pins to connect with the connecting terminals are disposed on the bottom side of the nipping plate section, so that, if the USB plug is connected to the USB socket, the contact pins are connected to the connecting terminals.

The plurality of the connecting terminals which are connected when the USB plug is inserted into the USB socket (Series A Receptacle) are terminals for VCC power circuit, GND power circuit, D+data transmission circuit and D−data transmission circuit. The D+data transmission circuit terminal and the D−data transmission circuit terminal are used for data transmission, and the VCC power circuit terminal and the GND power circuit terminal can receive a working current supplied by the USB host or the power supplying device.

Hereinafter, the terminals for the VCC power circuit, GND power circuit, D+data transmission circuit and D−data transmission circuit will be referred to as USB terminals and will be, collectively, referred to as USB terminal parts.

Because the USB (Series A) connector apparatus includes only four USB terminals, it can be considered to transmit a larger amount of information by increasing the number of terminals for signal transmission.

For example, between connecting terminals on the top face of the plate part of a USB plug of some USB connector, other connecting terminal for transmitting another signal is provided, and a contact pin is formed at a position matching the other connecting terminal of the substrate part of the USB plug to be connected on a USB socket nipping plate.

The USB employs a protocol of master/slave and devices using the USB interface have the relationship host and device. Usually, when connecting peripheral devices, it is necessary to provide at least one of the peripheral devices with a function as the host.

USB-OTB (USB On-The-Go), which allows the device side to supply electricity when the peripheral devices are connected, has been released, so that the peripheral device is operated as dual-role device which can serves as a device or a host. However, the function of SRP (Session Request Protocol) or HNP (Host Negotiation Protocol) is required to operate the USB-OTG thereby leading to increase in cost on the fields of software and hardware.

Patent Document 1 has disclosed a USB interface system in which the device and the host are connected through the USB cable such that the GND voltage of the ID terminal of the Mini-A receptacle is detected on the device side while electricity is supplied to the host side.

FIG. 1 is a diagram showing the configuration of the USB interface system described in Patent Document 1.

Referring to FIG. 1, USB interface system 10 includes peripheral device (hereinafter referred to as host) 11, which implements the function of the USB host, device (hereinafter simply "device") 12 which take the function of the USB device and USB cable 13 for connecting these.

According to USB2.0, the USB is constituted of a VBUS as a power line, D+line as a plus side data line, D−terminal as minus side data line, ground (GND) line and ID line for use in distinguishing a host or a device in the dual role device. Supply of electricity to a peripheral device on one side is carried out through the VBUS line. By transferring data serially on a pair of data lines constituted of the D+line and D−line, high speed data transfer is achieved.

Host 11 is controlled by a host controller (not shown), so that all processing generated in bus are started by the host. Host 11 includes Mini-A receptacle 14, which is a connector specialized for the host. Mini Mini-A plug 15 of the USB cable 13 can be inserted into Mini-A receptacle 14.

Device 12 includes a USB device controller (not shown). Because data transfer is controlled by a host controller, even if data is sent from the device side, no data can be sent unless the host gives a right of use of the bus to the device. Device 12 includes Mini-B receptacle 16, which is a connector specialized for the device. Mini-B plug 17 of the USB cable can be inserted into Mini-B receptacle 16. In the meantime, the device that performs the role of the device will be referred to as "B device".

USB cable 13 has a directivity and includes Mini-A plug 15 on one end and Mini-b plug 17 on the other end. Different shapes of the connectors on both ends of the cable prevent the USB hosts or USB devices to connect with each other by mistake.

While a USB connector of a conventional full size (standard) is provided with four terminals, these new connectors (plug and receptacle) have five terminals. That is, they have an ID terminal as well as the VBUS terminal, D+terminal, D−terminal and GND terminal. The ID terminal is used to, when a plug is inserted into a dual role device having the Mini-AB receptacle, distinguish whether it is Mini-A plug or Mini-B plug. Because in an ordinary USB cable based on USB-OTG, the ID terminal of the Mini-A plug is short-circuited by the GND line and the ID terminal of the Mini-B plug is open, which the Mini-A plug or the Mini-B plug has been connected can be determined by measuring the voltage level of the ID terminal.

In USB cable 13, the ID terminals of Mini-A plug 15 and Mini-B plug 17 are connected straightly through the ID line. The ID terminal of Mini-A receptacle 14 on the host side is connected to the GND line. Thus, if host 11 and device 12 are connected by USB cable 13, the ID terminal on device 12 side is connected to the GND line.

The ID terminal on device 12 side is pulled up. That is, the ID terminal is connected to a power supply Vcc through the pull-up resistor Rp and maintained at a predetermined voltage level ("H" level). Device 12 has power supplying section 18 for supplying electricity to the VBUS terminal. Power supply section 18 monitors the voltage level of the ID terminal and when it detects that the voltage level has dropped to a predetermined level ("L" level), starts supply of electricity.

In the system having the above-described configuration, if host 11 and device 12 are connected by USB cable 13, the ID terminal on device side 12 is short-circuited by the GND line so that the voltage level of the ID terminal drops. If power supply section 18 detects that the voltage level of the ID terminal is dropped from "H" to "L", it starts supply of electricity to the VBUS terminal, so that electricity is supplied to host 11 through the VBUS line of USB cable 13.

Patent Document 1: Japanese Patent Application Laid-Open No. 2005-25405

However, such a conventional USB interface system has following problems.

A mobile telephone having the USB terminal needs to connect with every kind of the peripheral device for the reason for diversification and multi-functionalization of the mobile telephone and as a result, the mobile telephone on the device side cannot meet demands from every kind of the peripheral device unless other function than the power supply function of the conventional technique is employed. More specifically, if a headphone is connected to the mobile telephone, signals necessary for the headphone need to be sent through the USB cable. If the mobile telephone is connected to a personal computer, it needs to be operated as a UART (Universal Asynchronous Receiver Transmitter) through the USB cable. Further, the USB terminal needs charging function, and the mobile telephone is demanded to implement adequate operations according to the charging apparatus connected to the USB terminal.

For example, if a Low-power hub is connected to the USB terminal, the mobile telephone on the device side needs to be charged with a charging current of 100 mA or less, and if a High-power hub is connected, it needs to be charged with a charging current of 200 mA or more.

SUMMARY OF THE INVENTION

The present invention is made in view of these problems and it is therefore an object of the invention to provide an interface detecting circuit and an interface detecting method, whereby, even when many peripheral devices are connected to USB terminals, adequate operations are allowed according to peripheral devices connected and whereby the system can be simplified and software load can be reduced.

According to an aspect of the present invention, there is provided an interface detecting circuit for detecting a type or a connecting state of a host on a device side in an interface system, in which a device and the host are connected via a USB cable, and, in this interface detecting circuit, a pull-down resistor is connected to an ID terminal of a mini-A receptacle of the host; and the device includes: a detecting section that detects a resistance value of the pull-down resistor connected to the ID terminal of the mini-A receptacle of the host; and an identifying section that identifies a type or a connecting state of the host based on the detected resistance value.

According to another aspect of the present invention, there is provided an interface detecting method for detecting the type of the host or the connecting state on a device side in an interface system, in which a device and the host are connected through a USB cable, and this the method includes: connecting a pull-down resistor to an ID terminal of a mini-A receptacle of the host; detecting the resistance value of the pull-down resistor connected to the ID terminal of the mini-A receptacle of the host on the device side; and identifying the type or a connecting state of the host based on the detected resistance value.

ADVANTAGEOUS EFFECT OF THE INVENTION

According to the present invention, even when many peripheral devices are connected to the USB terminals of electronic devices such as mobile telephones, adequate operations are made possible according to the types of peripheral devices connected, by detecting the type of peripheral devices on the electronic device of the device side through the USB cable, thereby simplifying the system and reducing software load. More specifically, the number of components, space and software load can be reduced.

DETAILED DESCRIPTION OF THE PREFERRED EMBODIMENTS

Hereinafter, the embodiments of the present invention will be described in detail with reference to the accompanying drawings.

Embodiment 1

Figure 1:
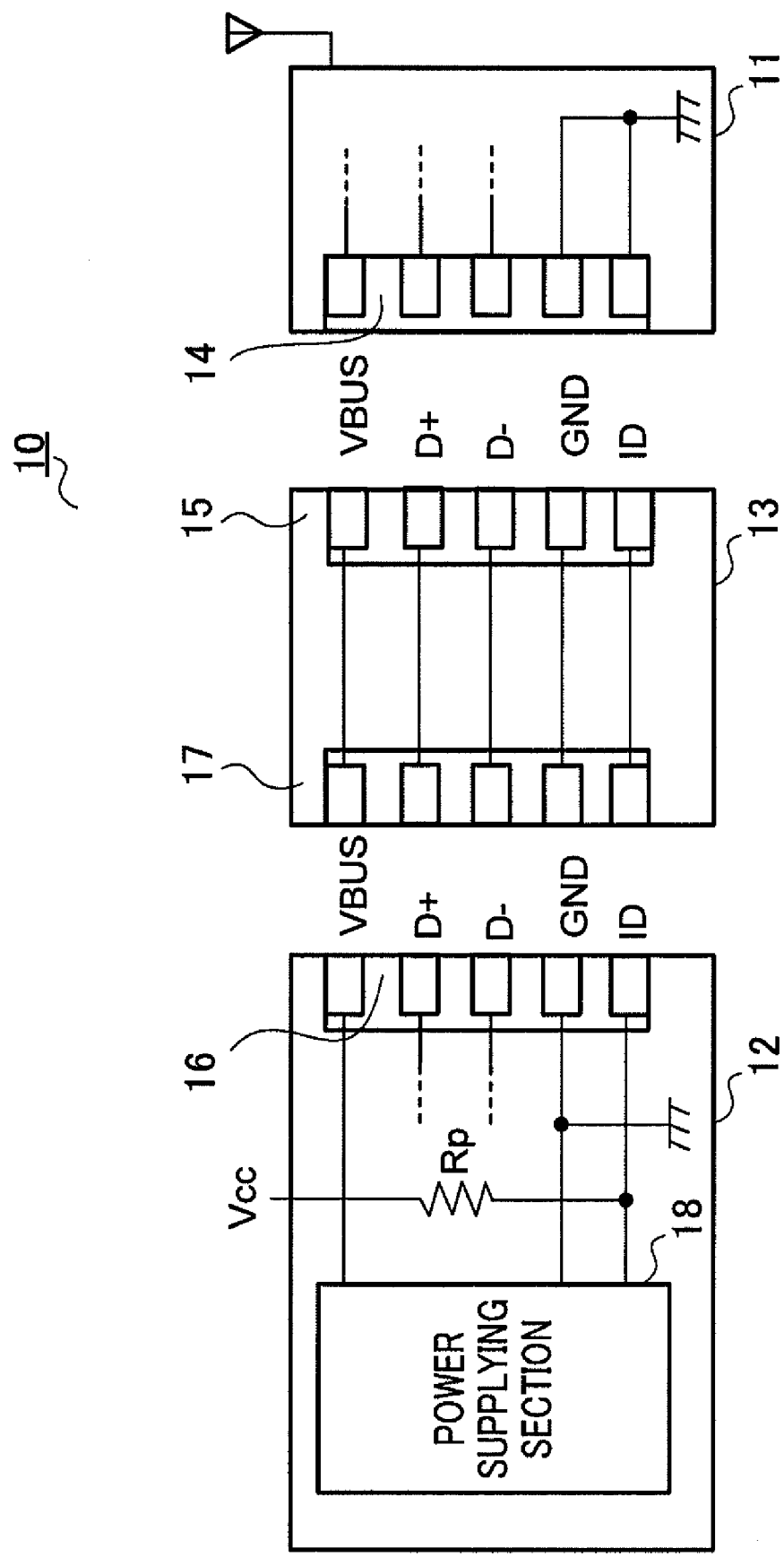
FIG. 1 is a diagram showing the configuration of a conventional USB interface system.
Figure 2:
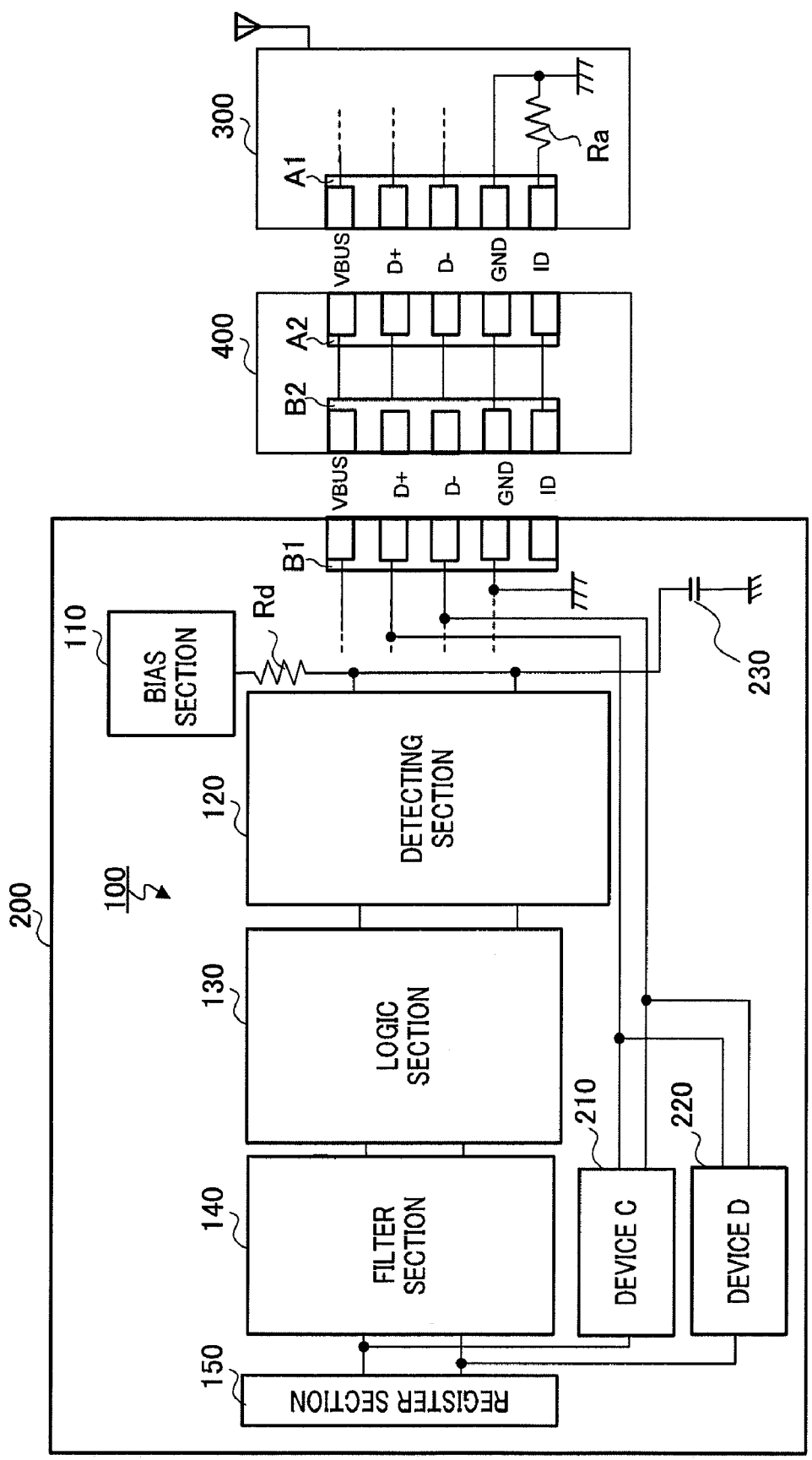
FIG. 2 is a diagram showing the configuration of an interface detecting circuit according to Embodiment 1 of the present invention.
Figure 3:
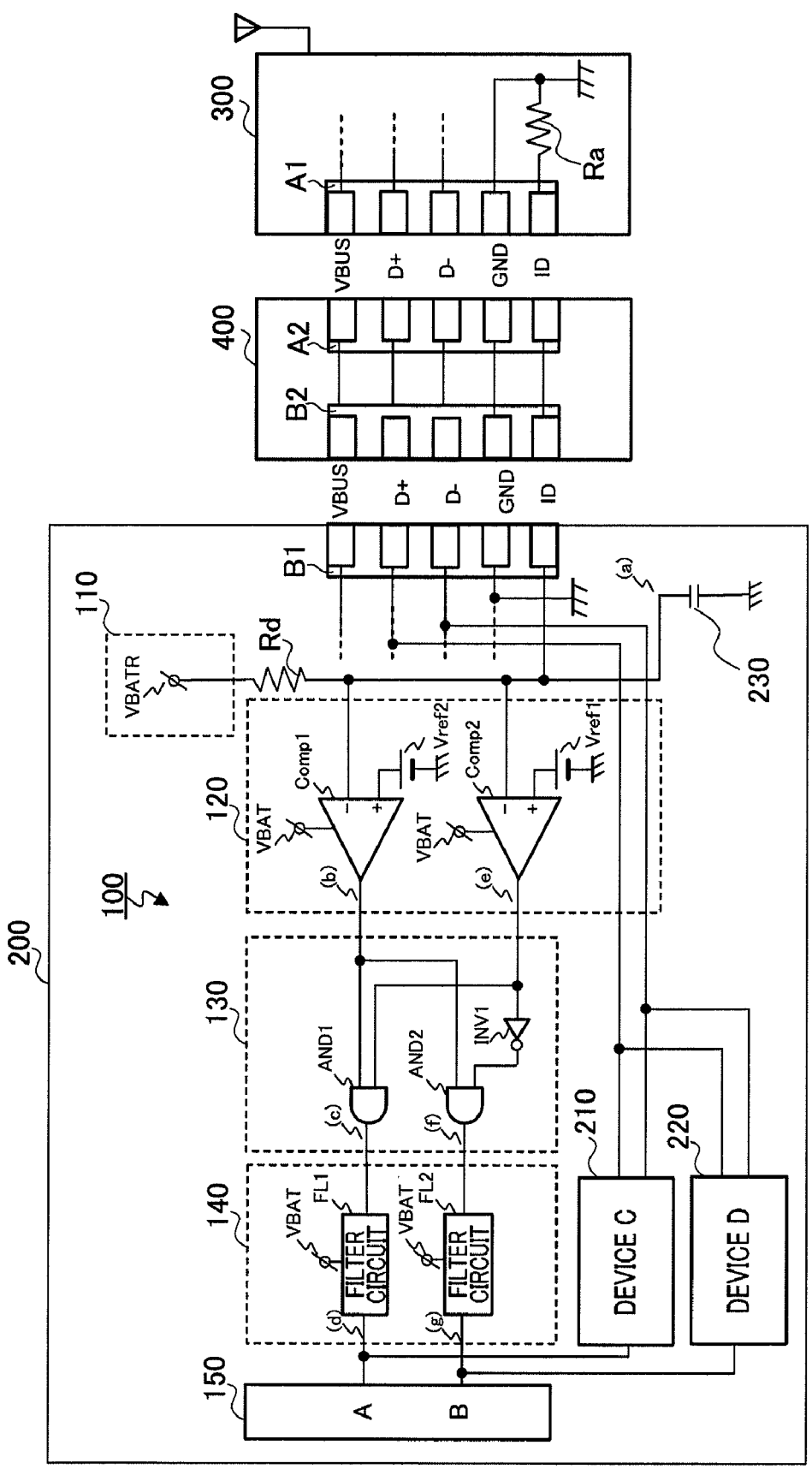
FIG. 3 is a detailed circuit diagram of the interface detecting circuit according to Embodiment 1.

FIG. 2 is a diagram showing the configuration of the interface detecting circuit according to Embodiment 1 of the present invention. FIG. 3 is a detailed circuit diagram of the interface detecting circuit of FIG. 2. This embodiment is an example in which the interface detecting circuit is applied to a USB interface system.

In FIGS. 2 and 3, the USB interface system includes interface detecting circuit 100 and device 200, which implements the function of a USB device (hereinafter simply "device"), peripheral device 300, which implements the function of a USB host and USB cable 400, which connects device 200 with host 300.

Device 200 includes Mini-B receptacle B1, pull-up resistor Rd, bias section 110, detecting section 120, logic section 130, filter section 140, register section 150, device C210, device D220 and capacitor 230. Resistor Rs of peripheral device 300 and resistor Rd of device 200 are connected by USB cable 400 and one end of resistor Rd is connected to bias section 110. Mini-B plug B2 of USB cable 400 can be inserted in Mini-B receptacle B1.

Pull-up resistor Rd, bias section 110, logic section 130, filter section 140, and resistor section 150 constitute interface detecting circuit 100 with pull-down resistor Rs of the peripheral device 300 side. Logic section 130, filter section 140 and resister section 150 function as an identifying section that identifies the type and connecting state of host 300 based on detection results in detecting section 120.

Device C210 and device D220 operate or do not operate, depending on the output of interface detecting circuit 100 (that is, the output of filter section 140). More specifically, device C210 is a CODEC device that communicates with peripheral device 300 by USB cable 400 so as to encode or play back audio signals. Device D220 is a UART device, which converts serial signals from the PC to parallel signals or the other way round.

Capacitor 230 cancel noise superimposed on the detection signals.

Peripheral device 300 includes Mini-A receptacle A1 and pull-down resistor Rs, where the resistance value of ID terminals changes depending on peripheral devices. Mini-A receptacle A1 of USB cable 400 can be inserted into Mini-A receptacle A1.

USB cable 400 includes Mini-A plug A2 which connects with Mini-A receptacle A1 and Mini-B plug B2 which connects with Mini-B receptacle B1 of device 200. USB cable 400 is a directional cable and has Mini-A plug A2 in one end and Mini-B plug B2 in the other end. Different connector shapes on both cable ends prevent USB hosts and USB devices from connecting with each other by mistake.

Mini-A receptacle A1, Mini-A plug A2, Mini-B receptacle and Mini-B plug B2 have five terminals, namely the VBUS terminal, the D+terminal, the D–terminal, the GND terminal and the ID terminal.

While conventional full-sized (standard) USB connectors have four terminals, the USB according to this embodiment has five terminals including new connectors (i.e. plug and receptacle). When the plug is inserted into a dual roll device having a Mini-AB receptacle, the ID terminal is used to decide whether the plug is a Mini-A plug or a Mini-B plug. With an ordinary USB supporting USB-OTG, the ID terminal of the Mini-A plug is short-circuited to the GND line and the ID terminal of the Mini-B plug is open. Consequently, which of the Mini-A plug and the Mini-B plug is connected, can be determined by measuring the voltage levels in the ID terminals.

In USB cable 400, the ID terminals of Mini-A plug A2 and Mini-B plug B2 are connected straight via an ID line. The ID terminal of Mini-A receptacle A1 of peripheral device 300 on the host side is connected to the GND line. Thus, if peripheral device 300 and device 200 are connected by USB cable 400, the ID terminal in the device 200 side is connected to the GND line.

According to this embodiment, pull-down resistor Rs, which pulls down the ID terminal of peripheral device 300 to a ground potential, is provided. With this pull-down resistor Rs, the value of resistance in the ID terminal changes depending on peripheral devices. By detecting the resistance of pull-down resistor Rs of peripheral device 300 with interface detecting circuit 100 in the device 200 side, the type of peripheral device 300, which is the host, is identified in the device 200 side. The identification result of the type of peripheral device 300 maybe used for other purposes as well. Device 200 switches device C210 and device D220 between operating and not operating, based on the output of interface detecting circuit 100.

The ID terminal of the device 200 side is pulled up to a high potential of bias section 110 by pull-up resistor Rd. The ID terminal is connected to the high potential of bias section 110 through pull-up resistor Rd and maintained at a predetermined voltage level ("H" level). Further, detecting section 120 of interface detecting circuit 100 is connected between the ID terminal and pull-up resistor Rd, and detecting section 120 compares the divided voltage of pull-down resistor Ra connected to the ID terminal of Mini-A receptacle A1 on the peripheral device 300 side and pull-up resistor Rd connected to Mini-B receptacle B1 in the device 200 side with at least one or more reference voltage, and, if the divided voltage is below a predetermined voltage, outputs a detection signal.

Components of interface detecting circuit 100 will be described more in detail now.

Referring to FIG. 3, bias section 110 supplies a constant voltage VBATR formed from a battery voltage, which is the power supply of device 200.

The ID terminal of device 200 is connected to the VBATR of bias section 110 through pull-up resistor Rd. The ID terminal of device 200 is connected to the ID terminal of peripheral device 300 through the ID terminal of USB cable 400. Consequently, pull-down resistor Rs of peripheral device 300 and pull-up resistor Rd of device 200 are connected by USB cable 400.

Detecting section 120 includes comparator Comp1, which compares the divided voltage of pull-down resistor Rs of peripheral device 300 and pull-up resistor Rd of device 200 with reference voltage Vref2, and a comparator Comp2, which compares the divided voltage with reference voltage Vref1. Vref1 is less than Vref2, and comparators Comp1 and Comp2 output comparison results (b) and (e) to logic section 130.

Logic section 130 includes AND circuit AND 1 and AND circuit AND 2 and inverter INV1. AND circuit AND 1 and AND circuit AND 2 output logic results (c) and (f) to filter section 140.

Filter section 140 includes filter circuit FL1 and filter circuit FL2, which are directed to canceling noise. Filter circuits FL1 and FL2 output the filtering outputs (d) and (g) to inputs A and B of register section 150.

Figure 4:
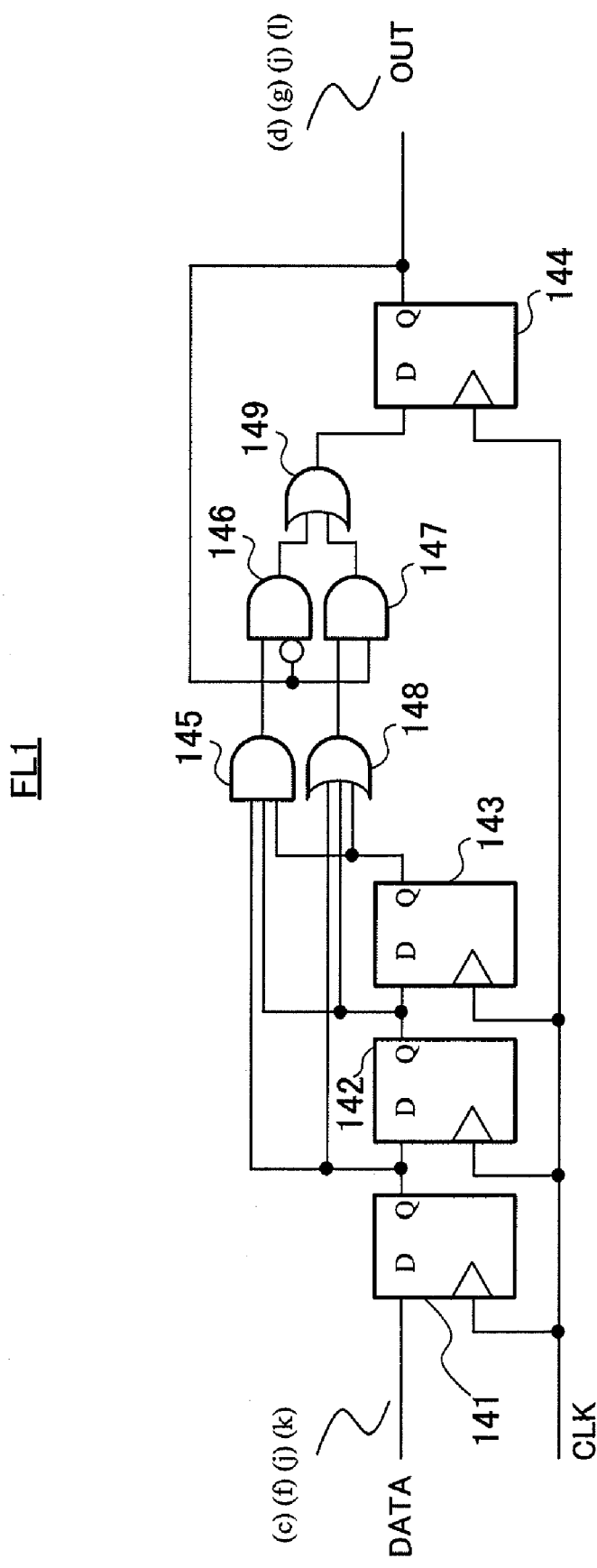
FIG. 4 is a circuit diagram showing the detailed configuration of a filter circuit of the interface detecting circuit according to Embodiment 1.

FIG. 4 is a circuit diagram showing a detailed configuration of filter circuits FL1 and FL2. Because filter circuits FL1 and FL2 have the same configuration, filter circuit FL1 will be described as a representative.

Referring to FIG. 4, filter circuit FL1 includes D flip-flops 141 to 144, AND circuits 145 to 147 and NOR circuits 148 and 149.

Figure 5:
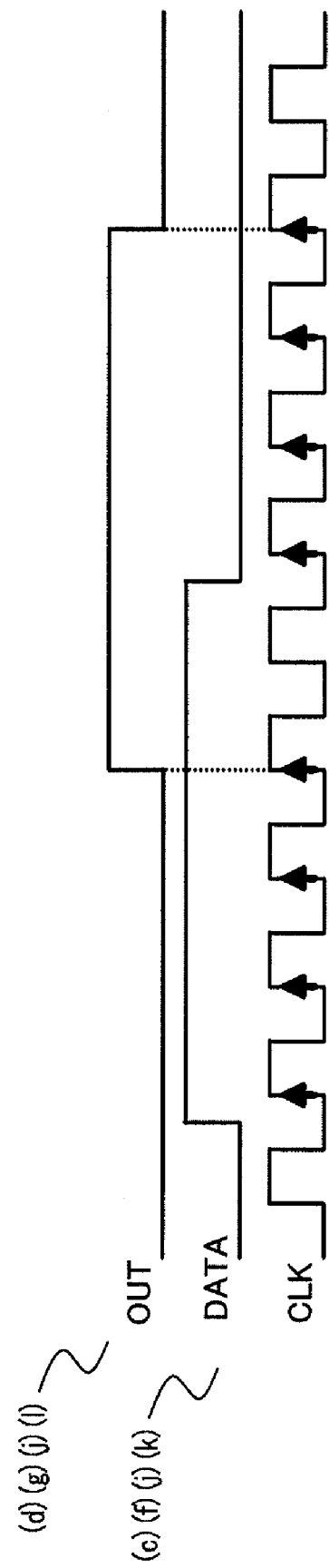
FIG. 5 is a timing diagram showing operation timings for CLK, DATA and OUT of the filter circuit of the interface detecting circuit according to Embodiment 1.

FIG. 5 is a timing chart showing the operation timing of CLK, DATA and OUT of filter circuit FL1. In the meantime, (i) to (k) in FIG. 4 and FIG. 5 are outputs of the filter section and logic section described later and are the same as signals (d) to (f) of this embodiment.

As shown in FIG. 5, after four edges of the CLK have passed since the rise (c) in FIG. 3, filter circuit FL1 of FIG. 3 outputs the H level (see FIG. 5(d)). Further, after four edges of the CLK have passed since the fall (c) in FIG. 3, filter circuit FL1 of FIG. 3 outputs the L level (see FIG. 5(d)). The relationship between signals (c) and (d) in FIG. 5 is shown in FIG. 6.

Figure 6:
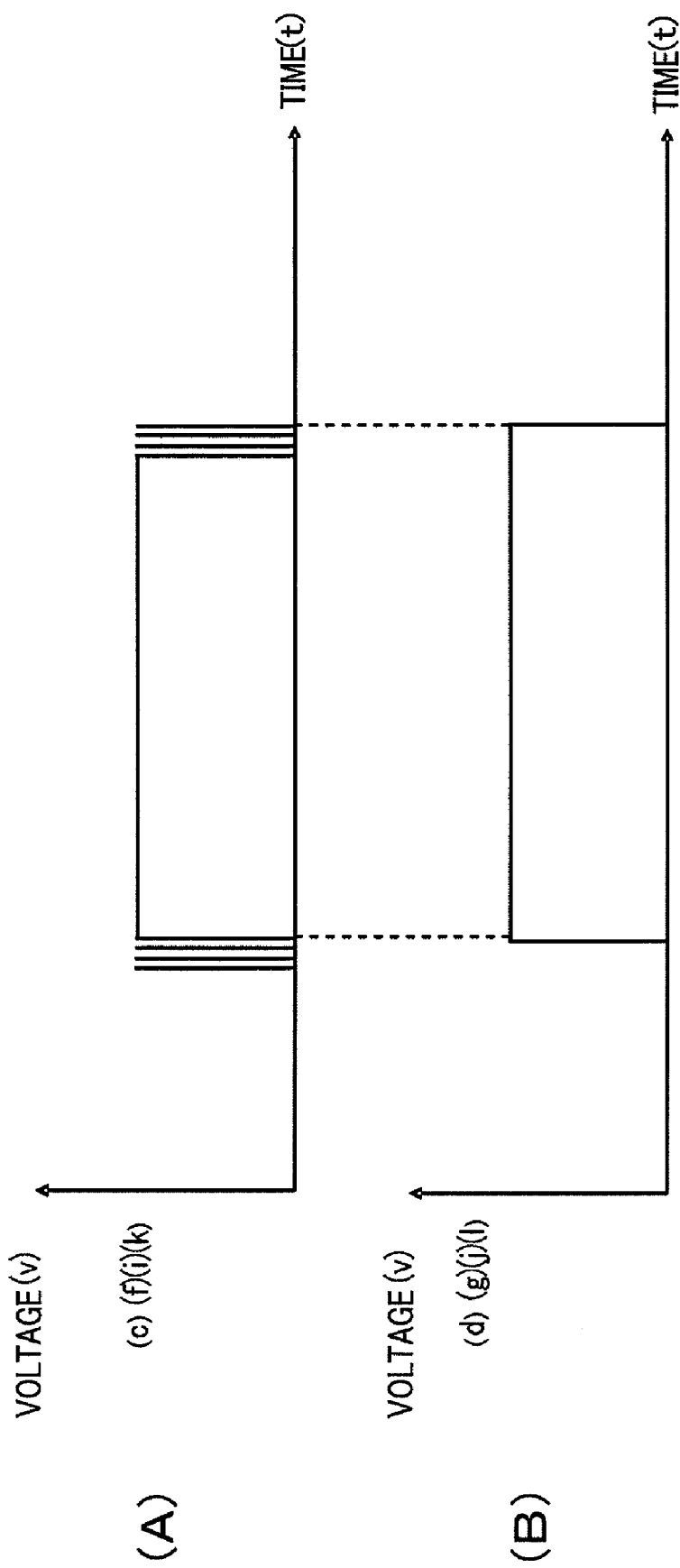
FIG. 6 is a timing diagram of input signal and output signal in the filter circuit of the interface detecting circuit according to Embodiment 1.

FIG. 6 is a timing chart of the input signal and output signal of filter circuit FL1, where FIG. 6(A) shows the output of logic section 130 and FIG. 6(B) shows the output of filter section 140. As shown in FIG. 6(A), chattering occurs in the output of logic section 130 and this chattering is removed from filter section 140.

The length of the four edges of the CLK is set such that the chattering of the output signal from comparators Comp1 and Comp2 is not transmitted to subsequent stages.

The operation of the interface detecting circuit having the above-described configuration will be described now.

Figure 7:
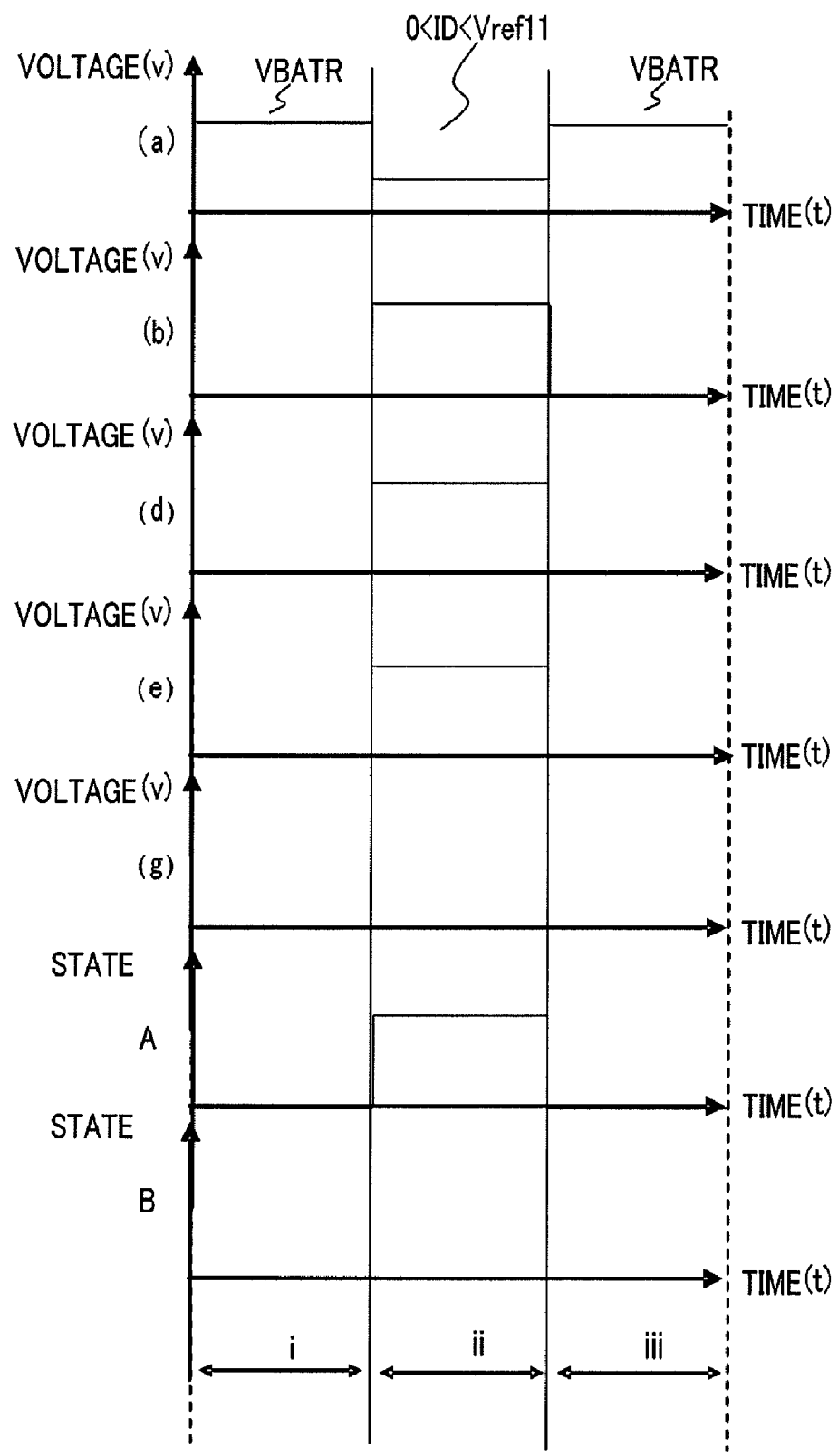
FIG. 7 is a timing diagram showing an operation of components of the interface detecting circuit according to Embodiment 1.
Figure 8:
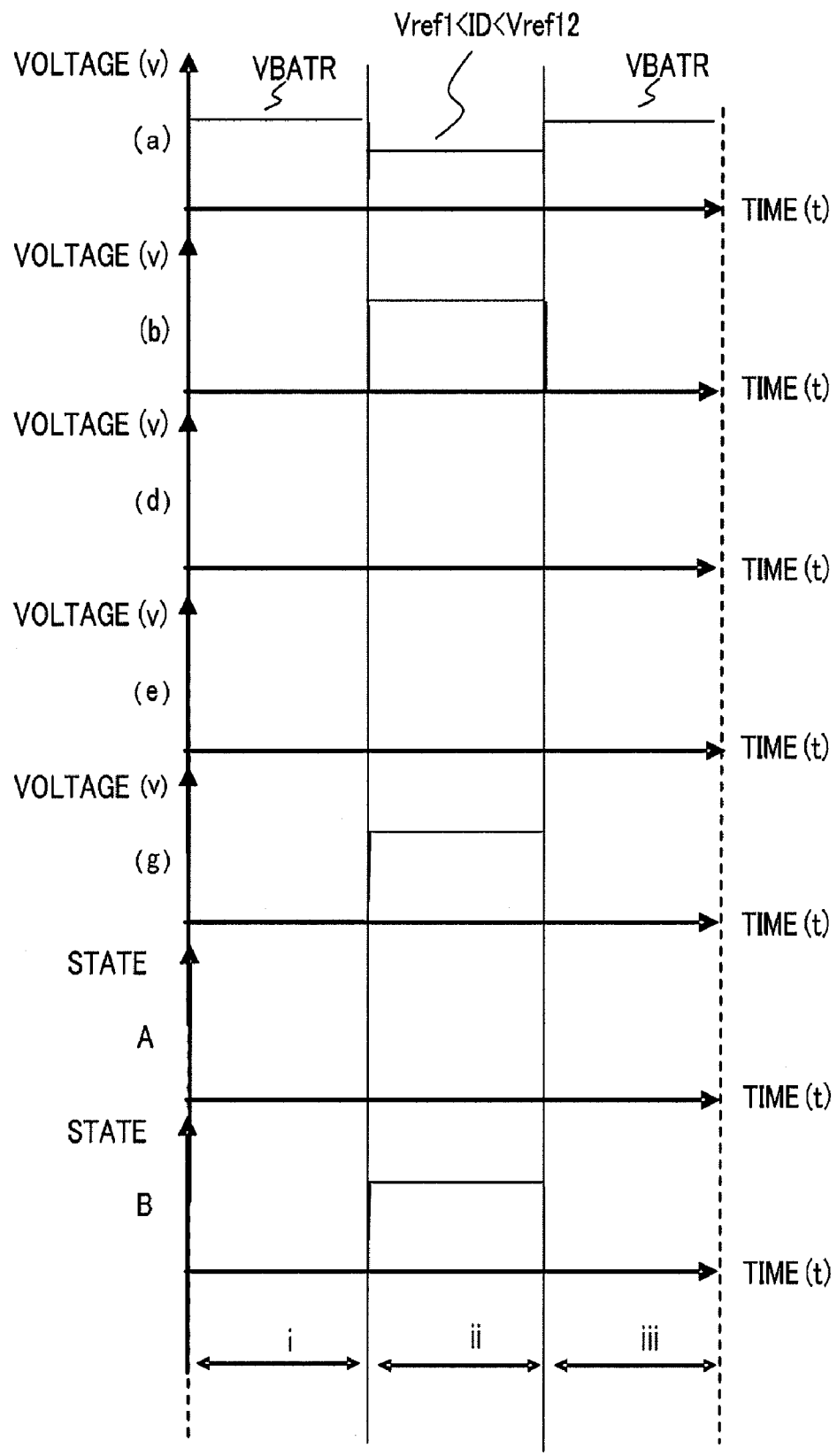
FIG. 8 is a timing diagram showing an operation of components of the interface detecting circuit according to Embodiment 1.

FIGS. 7 and 8 are timing charts showing the operations of the components of interface detecting circuit 100. The figures show a timing chart in case where pull-down resistor Rs of peripheral device 300 and pull-up resistor Rd of device 200 are connected by USB cable 400.

FIG. 7 shows a case where pull-down resistor Rs and pull-up resistor Rd of device 200 are connected and the ID voltage satisfies the relationship 0<ID voltage <Vref1. Further, the relationship Vref1<Vref2 holds.

The ranges (i), (ii) and (iii) in FIG. 7 will be described.

[Range (i) in FIG. 7]

Mini-A receptacle A1 and Mini-A plug A2, and Mini-B receptacle B1 and Mini-B plug B2 are not connected by USB cable 400.

Thus, (a) in FIG. 3 indicates VBATR and the output signal (b) of comparator Comp1 and the output signal (e) of comparator Comp2 indicate the L level.

Because both the output signals (b) and (e) of comparators Comp1 and Comp2 show the L level, the filtering outputs (d) and (g) of filter circuits FL1 and FL2 indicate the L level.

Because the filtering outputs (d) and (g) of filter circuits FL1 and FL2 show the L level, the states A and B of register section 150 show the L level.

[Range (ii) in FIG. 7]

Mini-A receptacle A1 and Mini-A plug A2, and Mini-B receptacle B1 and Mini-B plug B2 are connected by USB cable 400.

In this case, the ID voltage of Mini-B receptacle B2, which is the connecting point between pull-up resistor Rd of device 200 and pull-down resistor Rs of peripheral device 300, shows the relationship 0<ID<Vref1, as shown in FIG. 7(a). Further, the relationship Vref1 <Vref2 holds.

Thus, the output signal (b) of comparator Comp1 and the output signal (e) of comparator Comp2 show the H level.

Because the output signals (b) and (e) of comparators Comp1 and Comp2 show the H level, the logic output (d) of AND circuit AND1 indicates the H level.

Further, because the H level of the output signal (e) of comparator Comp2 is inverted by inverter INV1, the output (g) of filter circuit FL2, which is a result of filtering the logic output (f) of AND circuit AND2, indicates the L level.

As a result, the state A of register section 150 memorizes the H level and the state B memorizes the L level.

Because the state A of register section 150 shows the H level and the state B shows the L level, device C210 operates and device D220 does not operate. Device C210 is, for example, a CODEC device and exchanges audio signals with peripheral device 300 by USB cable 400.

[Range (iii) in FIG. 7]

Mini-A receptacle A1 and Mini-A plug A2, and Mini-B receptacle B1 and Mini-B plug B2 are not connected by USB cable 400. Thus, the operation is the same as in (i) in FIG. 7.

FIG. 8 shows a case where pull-down resistor Rs and pull-up resistor Rd of device 200 are connected and the ID voltage satisfies the relationship Vref1<ID voltage<Vref2.

The ranges (i), (ii) and (iii) in FIG. 8 will be described.

[Range (i) in FIG. 8]

Mini-A receptacle Aa and Mini-A plug A2, and Mini-B receptacle B1 and Mini-B plug B2 are not connected by USB cable 400. Further, the relationship Vref1<Vref2 holds.

Thus, (a) in FIG. 3 indicates VBTR, and the output signal (b) of comparator Comp1 and the output signal (e) of comparator Comp2 indicate the L level.

Because both the output signals (b) and (e) of comparators Comp1 and Comp2 show the L level, the filtering outputs (d) and (g) of filter circuits FL1 and FL2 indicate the L level.

Because the filtering outputs (d) and (g) of filter circuits FL1 and FL2 show the L level, the states A and B of register section 150 show the L level.

[Range (ii) in FIG. 8]

Mini-A receptacle A1 and Mini-A plug A2, and Mini-B receptacle B1 and Mini-B plug B2 are connected by USB cable 400.

In this case, the ID voltage of Mini-B receptacle B2, which is a connecting point between pull-up resistor Rd of device 200 and pull-down resistor Rs of peripheral device 300, shows the relationship Vref1<ID voltage<Vref2, as shown in FIG. 7(a). Further, the relationship Vref1<Vref2 holds.

Thus, the output signal (b) of comparator Comp1 shows the H level and the output signal (e) of comparator Comp2 shows the L level.

Because the output signal (b) of comparator Comp1 shows the H level and the output signal (e) of comparator Comp2 shows the L level, the logic output (d) of AND circuit AND1 shows the L level and the output (g) of filter circuit FL2, which is a result of filtering the logic output (f) of AND circuit AND2, which receives an inversion signal of inverter INV1, shows the H level.

As a result, the state A of register section 150 memorizes the L level and the state B memorizes the H level.

Because the state A of register section 150 shows the L level and the state B shows the H level, device C210 does not operate and device D220 operates. Device D220 is a UART device that converts serial signal from peripheral device 300 by USB cable 400 to parallel signals and the other way round.

[Range (iii) in FIG. 8]

Mini-A receptacle A1 and Mini-A plug A2, and Mini-B receptacle B1 and Mini-B plug B2 are not connected by USB cable 400. Thus, the operation is the same as in (i) in FIG. 8 occurs.

As described above, according to this embodiment, pull-down resistor Ra is connected with the ID terminal of Mini-A receptacle A1, and interface detecting circuit 100 detects the voltage generated by pull-down resistor Ra, which is pulled down by the ID terminal of Mini-A receptacle A1 of peripheral device 300, and pull-up resistor Rd, which is pulled up by the ID terminal of Mini-B receptacle B1 of device 200, in an analog fashion, using detecting section 120 including comparators Comp1 and Comp2, and, via logic section 130, the logic output subjected to noise cancellation through filter section 140 is memorized in A and B of register section 150. Then, whether device C210 and device D220 operate is determined depending on the states stored in A and B of register section 150. Consequently, even when many peripheral devices 300 are connected to the USB terminals of an electronic device such as a mobile telephone, the types of the peripheral devices 300 are detected through the USB cables on the electronic device side, thereby enabling adequate operations to be carried out depending on peripheral devices connected. According to this embodiment, where device C210 (CODEC device) and device D220 (UART device) in the device 200 side operate or do not operate, is switched according to the types of peripheral device 300. For example, if headphones are connected to a mobile telephone, device C210 operates so that signals required in the headphones can be sent by USB cable 400, and, if a PC is connected, device D220 operates so that the UART function can be started by USB cable 400.

By this means, adequate operations are allowed on the device 200 side, depending on peripheral device 300 connected, thereby simplifying the USB interface system and reducing software load.

Embodiment 2

Figure 9:
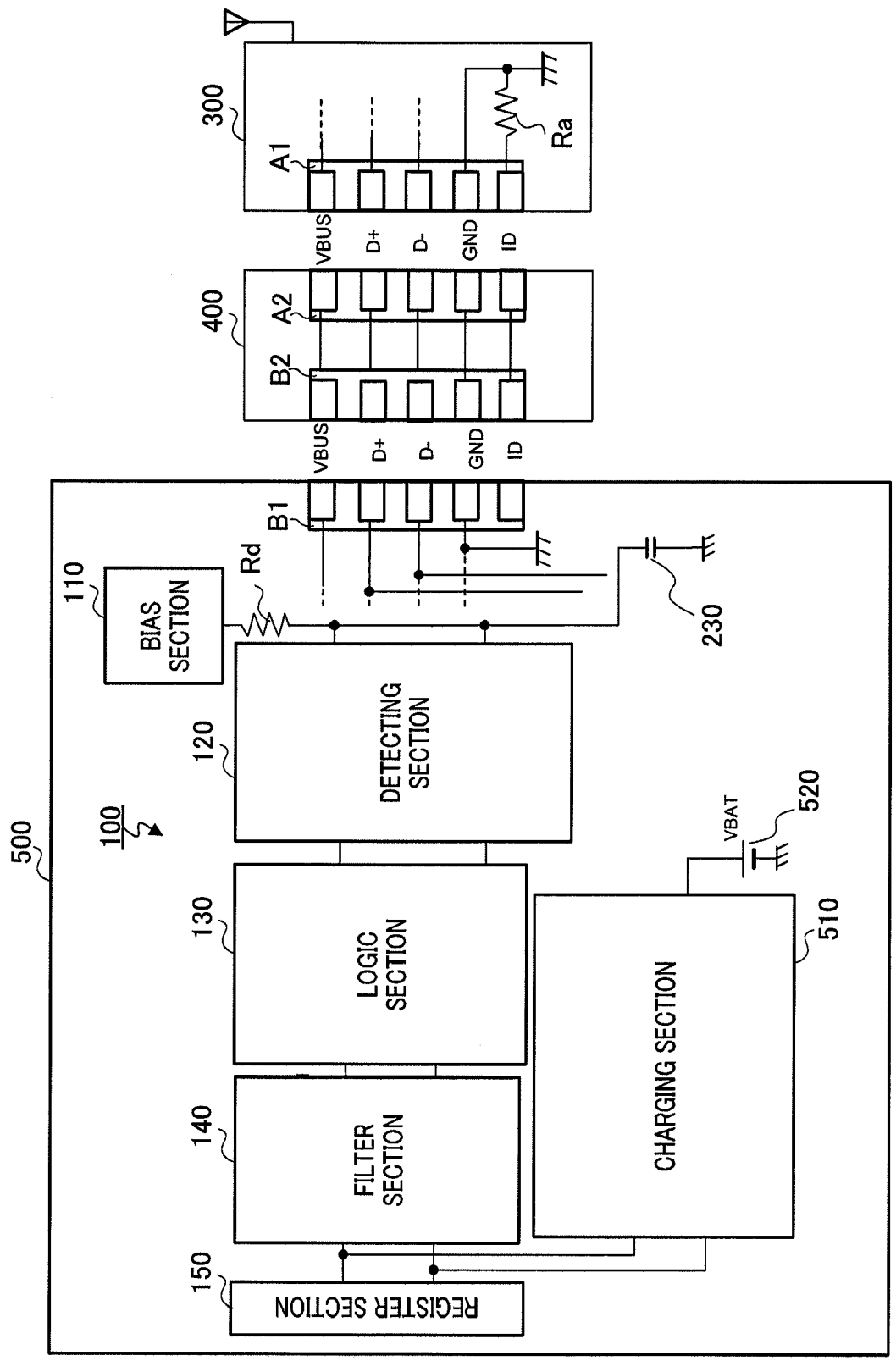
FIG. 9 is a diagram showing the configuration of the interface detecting circuit according to Embodiment 2 of the present invention.
Figure 10:
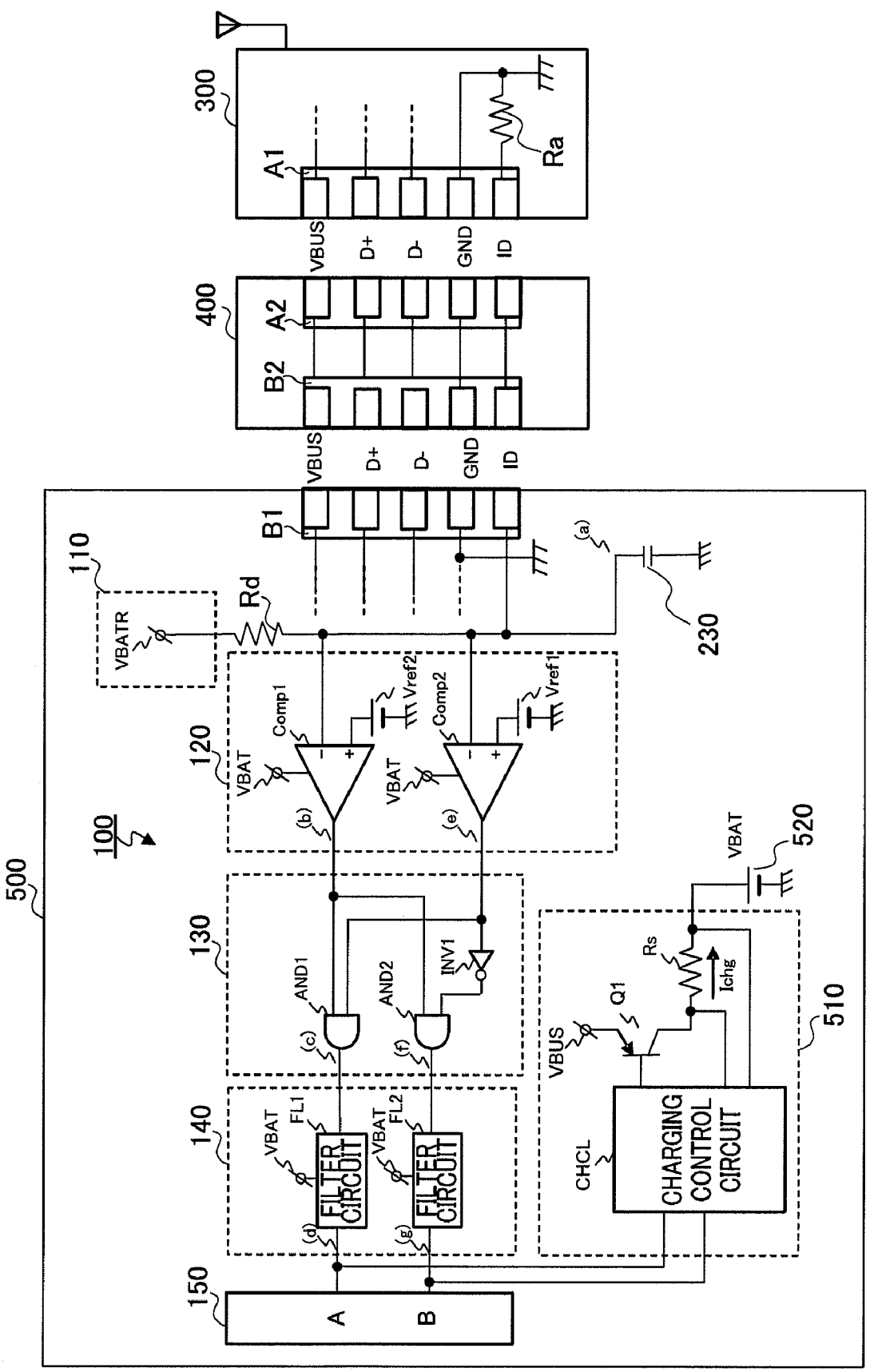
FIG. 10 is a detailed circuit diagram of the interface detecting circuit according to Embodiment 2.

FIG. 9 is a diagram showing the configuration of an interface detecting circuit according to Embodiment 2 of the present invention. FIG. 10 is a detailed circuit diagram of the interface detecting circuit of FIG. 9. Like reference numerals are assigned to the same components as FIG. 2 and FIG. 3 and description of overlapping sections will not be repeated.

In FIGS. 9 and 10, the USB interface system includes interface detecting circuit 100 and device (hereinafter simply "device") 500, which implements the function of a USB device, peripheral device 300, which implements the function of a USB host, and USB cable 400, which connects device 500 and host 300.

Device 500 includes Mini-B receptacle B1, pull-up resistor Rd, bias section 110, detecting section 120, logic section 130, filter section 140, register section 150, charging section 510, battery 520 and capacitor 230. Resistor Rs of peripheral device 300 and resistor Rd of device 500 are connected by USB cable 400 and one end of resistor Rd is connected to bias section 110.

Pull-up resistor Rd, bias section 110, detecting section 120, logic section 130, filter section 140, and resistor section 150 constitute interface detecting circuit 100 with pull-down resistor Rs on the peripheral device 300 side.

Charging section 510 charges battery 520. The VBAT is the battery voltage.

The ID terminal on the device 500 side is pulled up to a high potential of bias section 110 by pull-up resistor Rd. The ID terminal is connected to the high potential of bias section 110 through pull-up resistor Rd and maintained at a predetermined voltage level ("H" level). Further, detecting section 120 of interface detecting circuit 100 is connected between the ID terminal and pull-up resistor Rd, and this detecting section 120 compares the divided voltage of resistor Ra, which is connected to the ID terminal of Mini-A receptacle A1 on the peripheral device 300 side, and resistor Rd, which is connected to Mini-B receptacle B1 on the device 500 side, with at least one or more reference voltages, and, if the divided voltage is a predetermined voltage or less, outputs a detection signal.

The configuration of components of interface detecting circuit 100 will be described more in detail now.

In FIG. 10, bias section 110 supplies a constant voltage VBUSR formed of VBUS voltage. The VBUSR is a constant voltage generated from the VBUS voltage when power is supplied from Mini-A receptacle A1 to the VBUS terminal of Mini-B receptacle B1 by USB cable 400.

Charging section 510 includes charging control circuit CHCL, PNP bi-polar transistor Q1, which is driven by VBUS power supply and sense resistor Rs.

Charging control circuit CHCL controls a the charging current Ichg with sense resistor Rs.

PNP bi-polar transistor Q1 is controlled by charging control circuit CHCL and charges battery 520 by supplying the VBUS power to battery 520.

In this case, assume that the current of the charging current Ichg changes depending on signals of the states A and B in resistor 150.

According to this embodiment, pull-down resistor Rs, which pulls down the ID terminal of peripheral device 300 to a grounding potential, is provided. With this pull-down resistor Rs, the resistance value in the ID terminal changes depending on peripheral devices. By detecting the resistance value of pull-down resistor Rs of peripheral device 300 using interface detecting circuit 100 on the device 500 side, the type of peripheral device 300, which is the host on the device 500 side, is identified. The identification result of the type of peripheral device 300 may be used for other purposes as well. Here, device 500 switches the charging operation of charging control circuit CHCL, based on the output of interface detecting circuit 100.

According to this embodiment, device 500 includes charging section 510 and battery 520, instead of device C210 and device D220 of Embodiment 1.

The operation of the interface detecting circuit having the above-described configuration will be described now.

Figure 11:
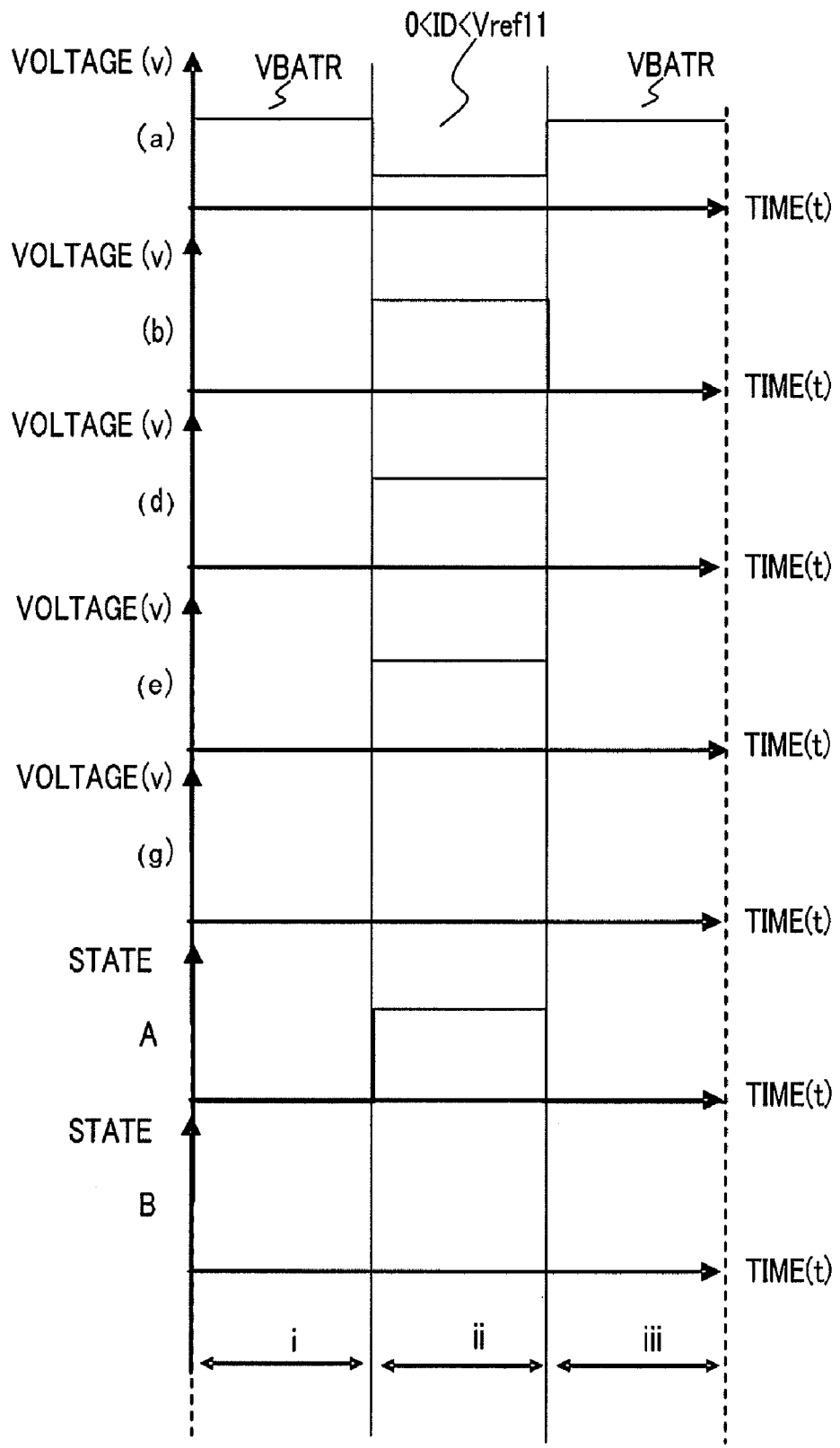
FIG. 11 is a timing diagram showing the operations of the components of the interface detecting circuit according to Embodiment 2.
Figure 12:
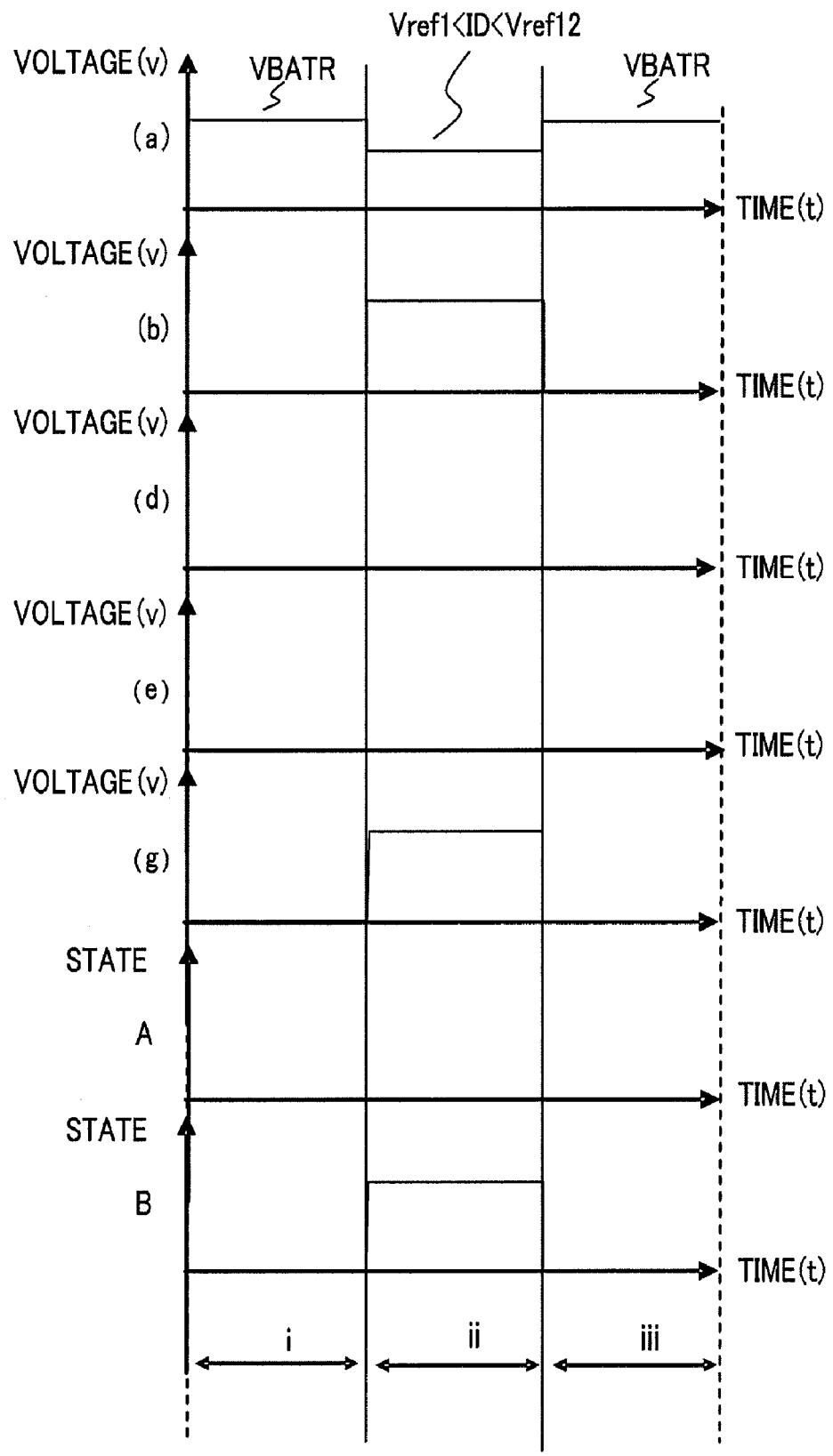
FIG. 12 is a timing diagram showing the operations of the components of the interface detecting circuit according to Embodiment 2.

FIGS. 11 and FIG. 12 are timing charts showing the operation of the components of interface detecting circuit 100. The same figures indicate a timing chart in case where pull-down resistor Rs of peripheral device 300 and pull-up resistor Rd of device 500 are connected via USB cable 400.

FIG. 11 shows a case where pull-down resistor Rs and pull-up resistor Rd of device 500 are connected and the ID voltage satisfies the relationship 0<ID voltage<Vref1. Further, the relationship Vref1<Vref2 holds.

The ranges (i), (ii) and (iii) in FIG. 11 will be described.

[Range (i) in FIG. 11]

Mini-A receptacle A1 and Mini-A plug A2, and Mini-B receptacle B1 and Mini-B plug B2 are not connected by USB cable 400.

Thus, (a) in FIG. 11 indicates VBATR and the output signal (b) of comparator Comp1 and the output signal (e) of comparator Comp2 indicate the L level.

Because both the output signals (b) and (e) of comparators Comp1 and Comp2 show the L level, the filtering outputs (d) and (g) of filter circuits FL1 and FL2 indicate the L level.

Because the filtering outputs (d) and (g) of filter circuits FL1 and FL2 show the L level, the states A and B in register section 150 show the L level.

[Range (ii) in FIG. 11]

Mini-A receptacle A1 and Mini-A plug A2, and Mini-B receptacle B1 and Mini-B plug B2 are connected by USB cable 400.

In this case, the ID voltage in Mini-B receptacle B2, which is the connecting point between pull-up resistor Rd of device 500 and pull-down resistor Rs of peripheral device 300, shows the relationship 0<ID<Vref1 shown in FIG. 11(a). Further, the relationship Vref1<Vref2 holds.

Thus, the output signal (b) of comparator Comp1 and the output signal (e) of comparator Comp2 show the H level.

Because the output signals (b) and (e) of comparators Comp1 and Comp2 show the H level, the logic output (d) of AND circuit AND1 indicates the H level.

Further, because the H level of the output signal (e) of comparator Comp2 is inverted by inverter INV1, the output (g) of filter circuit FL2, which is a result of filtering the logic output (f) of AND circuit AND2, indicates the L level.

As a result, the state A of register section 150 memorizes the H level and the state B memorizes the L level.

Because the state A of register section 150 shows the H level and the state B shows the L level, the charging current Ichg of charging section 510 becomes lower than a predetermined current amount. More specifically, the charging current is 100 mA or less.

[Range (iii) in FIG. 11]

Mini-A receptacle A1 and Mini-A plug A2, and Mini-B receptacle B1 and Mini-B plug B2 are not connected via USB cable 400. Thus, the same operation is the same as in (i) in FIG. 11.

FIG. 12 shows a case where pull-down resistor Rs and pull-up resistor Rd of device 500 are connected and the ID voltage satisfies the relationship Vref1<ID voltage<Vref2.

The ranges (i), (ii), and (iii) in FIG. 12 will be described.

[Range (i) in FIG. 12]

Mini-A receptacle A1 and Mini-A plug A2, and Mini-B receptacle B1 and Mini-B plug B2 are not connected by USB cable 400. Further, the relationship Vref1<Vref2 holds.

Thus, (a) in FIG. 10 indicates VBATR and the output signal (b) of comparator Comp1 and the output signal (e) of comparator Comp2 indicate the L level.

Because both the output signals (b) and (e) of comparators Comp1 and Comp2 show the L evel, the filtering outputs (d) and (g) of filter circuits FL1 and FL2 indicate the L level.

Because the filtering outputs (d) and (g) of filter circuits FL1 and FL2 show the L level, the states A and B of register section 150 show the L level.

[Range (ii) in FIG. 12]

Mini-A receptacle A1 and Mini-A plug A2, and Mini-B receptacle B1 and Mini-B plug B2 are connected by USB cable 400.

In this case, the ID voltage of Mini-B receptacle B2, which is the connecting point between pull-up resistor Rd of device 200 and pull-down resistor Rs of peripheral device 300, shows the relationship Vref1<ID voltage<Vref2 shown in FIG. 7(a). Further, the relationship Vref1<Vref2 holds.

Thus, the output signal (b) of comparator Comp1 shows the H level and the output signal (e) of comparator Comp2 shows the L level.

Because the output signal (b) of comparator Comp1 shows the H level and the output signal (e) of comparator Comp2 shows the L level, the logic output (d) of AND circuit AND1 shows the L level and output (g) of filter circuit FL2, which is a result of filtering, the logic output (f) of AND circuit AND2, which receives the inverted signal of inverter INV1 shows the H level.

As a result, the state A of register section 150 memorizes the L level and the state B memorizes the H level.

Because the state A of register section 150 shows the L level and the state B shows the H level, the charging current Ichg of charging section 510 is increased over a predetermined current amount. More specifically, the charging current becomes 200 mA or more.

[Range (iii) in FIG. 12]

Mini-A receptacle A1 and Mini-A plug A2, and Mini-B receptacle B1 and Mini-B plug B2 are not connected by USB cable 400. Thus, the operation is the same as in (i) in FIG. 12.

Thus, by detecting the voltage generated by pull-down resistor Ra, which is pulled down by the ID terminal of Mini-A receptacle A1 of peripheral device 300, and pull-up resistor Rd, which is pulled up by the ID terminal of Mini-B receptacle B1 of device 200, in an analog fashion, using detecting section 120, including comparators Comp1 and Comp2, and, via logic section 130, by canceling noise in filter section 140, memorizes the logic outputs (d) and (g), which are detection results, in A and B in register section 150, and determines the operation of charging section 510.

According to this embodiment, pull-down resistor Ra is connected to the ID terminal of Mini-A receptacle A1 of peripheral device 300 and interface detecting circuit 100 detects the voltage generated by pull-down resistor Ra, which is pulled down by the ID terminal of Mini-A receptacle A1 of peripheral device 300, and pull-up resistor Rd, which is pulled up by the ID terminal of Mini-B receptacle Bi of device 500, in analog fashion, using detecting section 120 including comparators Comp1 and Comp2, and, via logic second 130, the logic output, subjected to noise cancellation in filter section 140, is stored in A and B in register section 150. Then, the charging operation of charging control circuit CHCL is changed over following a state stored in A and B of register section 150. Consequently, if a low-power hub is connected to the USB terminal, charging can be executed on the portable telephone side of device 500 with a charging current of 100 mA or less. If a high-power hub is connected thereto, charging can be carried out with a charging current of 200 mA or more. By this means, adequate operations are allowed in the mobile telephone on the device 500 side depending on the charging battery connected to the USB terminal, thereby simplifying the USB interface system and reducing software load.

Embodiment 3

Figure 13:
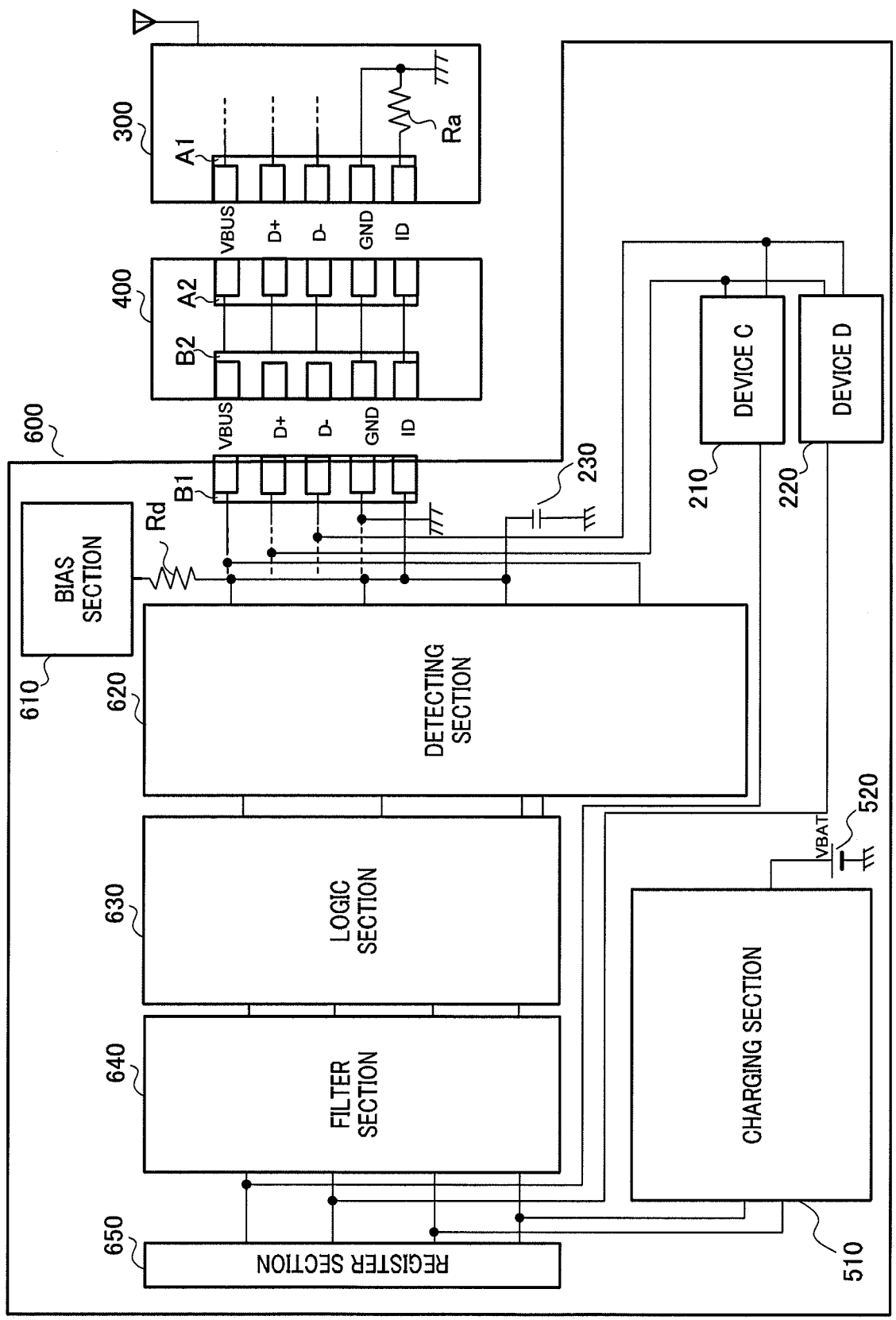
FIG. 13 is a diagram showing the configuration of the interface detecting circuit according to Embodiment 3 of the present invention.
Figure 14:
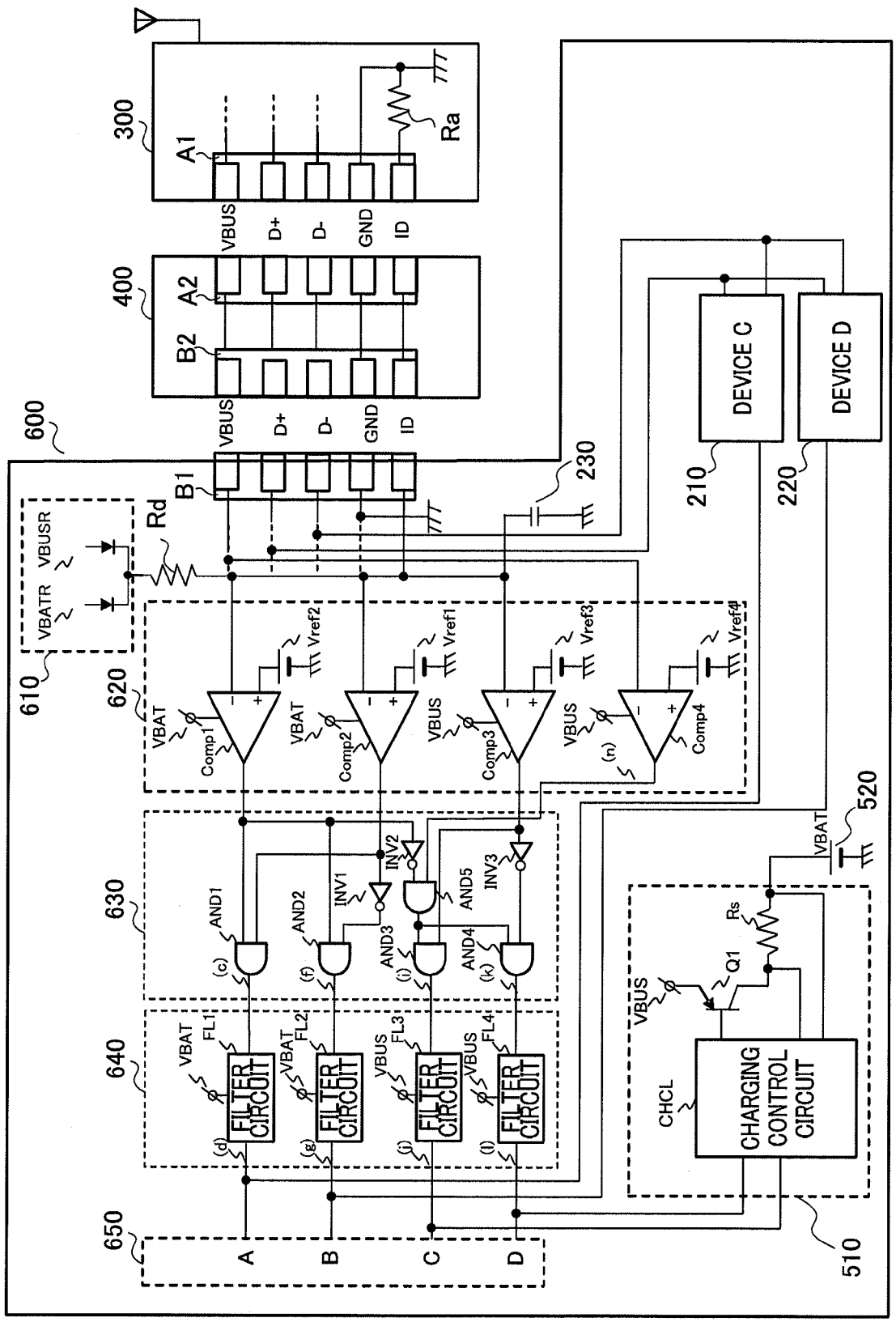
FIG. 14 is a detailed circuit diagram of the interface detecting circuit according to Embodiment 3.

FIG. 13 is a diagram showing the configuration of the interface detecting circuit according to Embodiment 3 of the present invention. FIG. 14 is a detailed circuit diagram of the interface detecting circuit of FIG. 13. Like reference numerals are assigned to the same components as in FIG. 2, FIG. 3, FIG. 9 and FIG. 10 and overlapping descriptions of such parts will not be repeated.

In FIGS. 13 and 14, the USB interface system includes main parts of interface detecting circuit 100A and device (hereinafter simply "device") 600, which implements the function of a USB device, peripheral device 300, which implements the function of a USB host, and USB cable 400, which connects device 500 with host 300.

Device 600 includes Mini-B receptacle B1, pull-up resistor Rd, bias section 610, detecting section 620, logic section 630, filter section 640, register section 650, device C210, device D220, charging section 510, battery 520 and capacitor 230. Resistor Rs of peripheral device 300 and resistor Rd of device 600 are connected by USB cable 400 and one of resistor Rd is connected to bias section 610.

Pull-up resistor Rd, bias section 610, detecting section 620, logic section 630, filter section 640, and resistor section 650 constitute interface detecting circuit 100A with pull-down resistor Rs on the peripheral device 300 side.

The ID terminal of device 600 side is pulled up to a high potential of bias section 610 by pull-up resistor Rd. The ID terminal is connected to the high potential of bias section 610 through pull-up resistor Rd and maintained at a predetermined voltage level ("H" level). Further, detecting section 620 of interface detecting circuit 100A is connected between the ID terminal and pull-up resistor Rd, and the detecting section 620 compares the divided voltage of resistor Ra, which is connected to the ID terminal of Mini-A receptacle A1 on the peripheral device 300 side, and resistor Rd, which is connected to Mini-B receptacle B1 on the device 600 side, with at least one or more reference voltages, and, if the divided voltage is a predetermined voltage or less, outputs a detection signal.

According to this embodiment, device 600 includes device C210 and device D220 of Embodiment 1 and charging section 510 of Embodiment 2, and controls device C210, device D220 and charging section 510 to operate and not to operate, according to detection results in interface detecting circuit 100A. Thus, in Embodiments 1 and 2, several bias sections 610, detecting sections 620, logic sections 630, filter sections 640 and register sections 650 provided in parallel.

Hereinafter, the configuration of components of interface detecting circuit 100A will be described more in detail.

In FIG. 14, bias section 610 supplies two power supplies, VBATR and VBUSR through diodes D1 and D2. The VBATR is a constant voltage formed from a battery voltage, which is the power supply of device 200. The VBUSR is a constant voltage generated from the VBUS voltage when power is supplied to the VBUS terminal of Mini-B receptacle B1 from Mini-A receptacle A1 by USB cable 400. Due to the two power supplies of the VBATR and VBUSR, flow back is prevented by diode D1 and diode D2.

The ID terminals of device 600 are connected to the VBATR and VBUS voltages of bias section 610 through pull-up resistor Rd. The ID terminal of device 600 is connected to the ID terminal of peripheral device 300 through the ID terminal of USB cable 400. Consequently, pull-down resistor Rs of peripheral device 300 and pull-up resistor Rd of device 600 are connected via USB cable 400.

Detecting device 620 includes comparators Comp1, Comp2, Comp3 and Comp4, which compare the divided voltage of pull-down resistor Rs of peripheral device 300 and pull-up resistor Rd of device 600, with reference voltage Vref2, reference voltage Vref1, reference voltage Vref3 and reference voltage Vref4. The comparator Comp4 detects the VBUS terminal voltage of Mini-B receptacle B1. Comparators Comp1 and Comp2, Comp3 and Comp4 output comparison results (b) and (e), (h) and (m), to logic section 630.

Logic section 130 includes AND circuits AND1, AND2, AND3, AND4 and AND5 and inverters INV1, INV2 and INV3. AND circuits AND1, AND2, AND3 and AND4 output the logic results (c), (f), (i) and (k) to filter section 640, respectively.

Filter section 640 is constituted of filter circuits FL1, FL2, FL3 and FL4, which are directed to canceling noise. Filter circuits FL1, FL2, FL3 and FL4 output the filtering outputs (d), (g), (j) and (l) to inputs A, B, C and D of register section 650.

The detailed configuration of filter circuits FL1, FL2, FL3 and FL4 is shown in FIG. 4 and a timing chart indicating the operation timing of CLK, DATA and OUT of the filter circuit FL1 of FIG. 4 is shown in FIG. 5.

As shown in FIG. 5, after four edges of the CLK have passed since the rise (c), (f), (i) or (k) in FIG. 14, filter circuits FL1, FL2, FL3 and FL4 of FIG. 14 output the H level. Further, after four edges of the CLK have passed since the fall (c), (f), (i) or (k) in FIG. 14, filter circuits FL1, FL2, FL3 and FL4 of FIG. 3 output the L level. The relationship between signals (c), (f), (i) or (k) and (d), (g), (j) and (l) in FIG. 5 is shown in FIG. 6.

The length of the four edges of the CLK is set such that the chattering of the output signal from comparators Comp1 and Comp2, Comp3 and Comp4 is not transmitted to subsequent stages.

According to this embodiment, pull-down resistor Rs, which pulls down the ID terminal of peripheral device 300 to a grounding potential is provided. With this pull-down resistor Rs, the resistance value of the ID terminal changes depending on peripheral devices. By detecting the resistance value of pull-down resistor Rs of peripheral device 300 with interface detecting circuit 100 on the device 600 side, the type of peripheral device 300, which is the host, is identified on the device 600 side. The identification result of the type of peripheral device 300 may be used for other purposes as well. Here, device 600 changes the charging operation of charging control circuit CHCL based on the output of interface detecting circuit 100A and further switches device C210 and device D220 between operating and not operating.

Hereinafter, the operation of the interface detecting circuit having the above-described configuration will be described.

Referring to FIG. 14, if no VBUS voltage of Mini-B receptacle B1 is present, the output signal (m) of comparator Comp4 shows the L level, and (i) and (l) of FIG. 14 is fixed to the L level by AND circuit AND5, AND circuit AND3 and AND circuit AND4. Further, in bias section 610, the voltage of VABTR is applied to pull-up resistor Rd through diode D1.

In this case, the operations of 0<ID voltage<Vref1 and Vref1<ID voltage<Vref3 are determined by comparator Comp1 and comparator Comp2, as in Embodiment 1.

Hereinafter, in case of VBUS voltage>Vref4, a case of Vref2<ID voltage<Vref3 and a case of Vref3<ID voltage will be described in detail.

Figure 15:
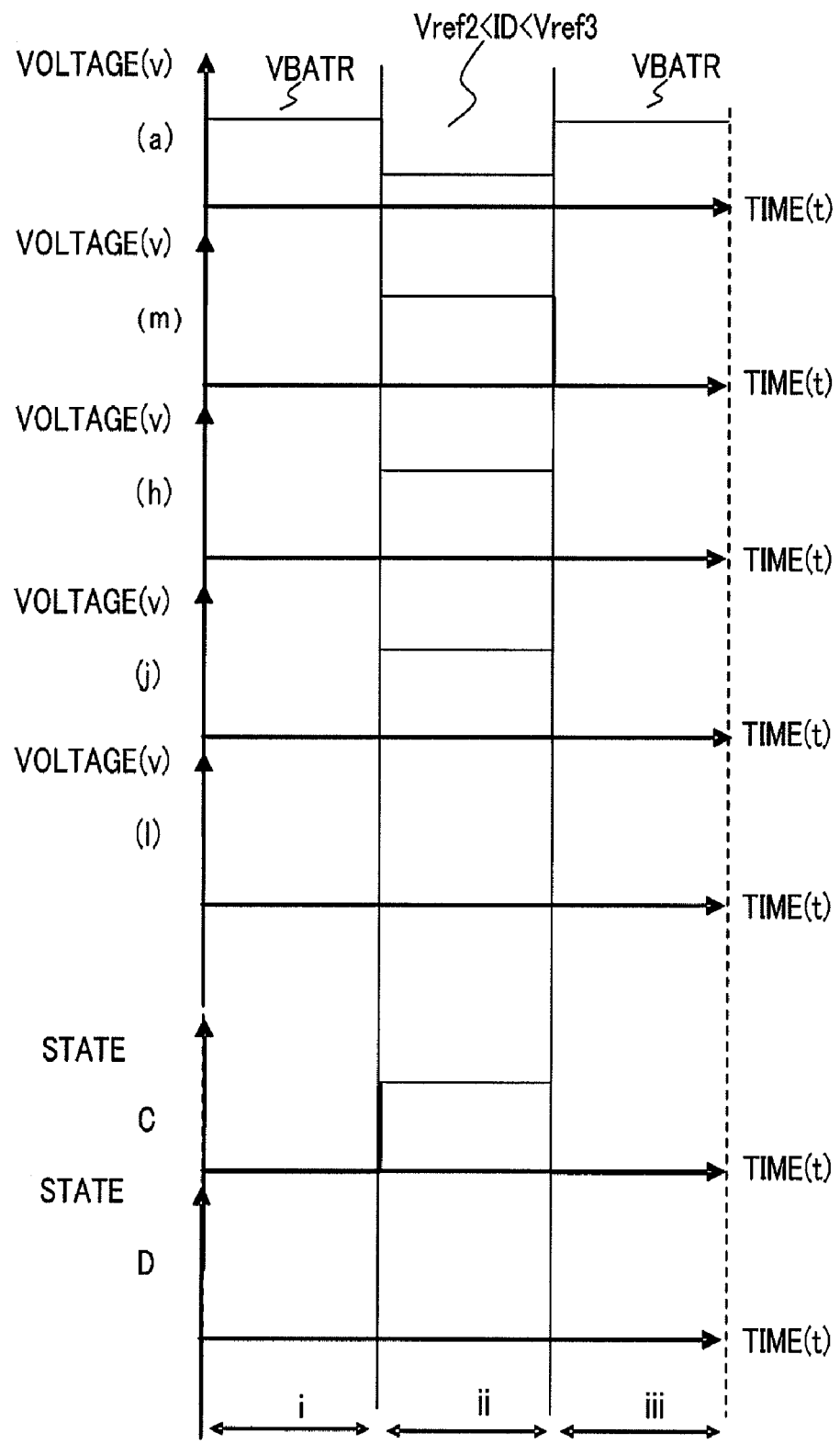
FIG. 15 is a timing diagram showing the operations of the components of the interface detecting circuit according to Embodiment 3.
Figure 16:
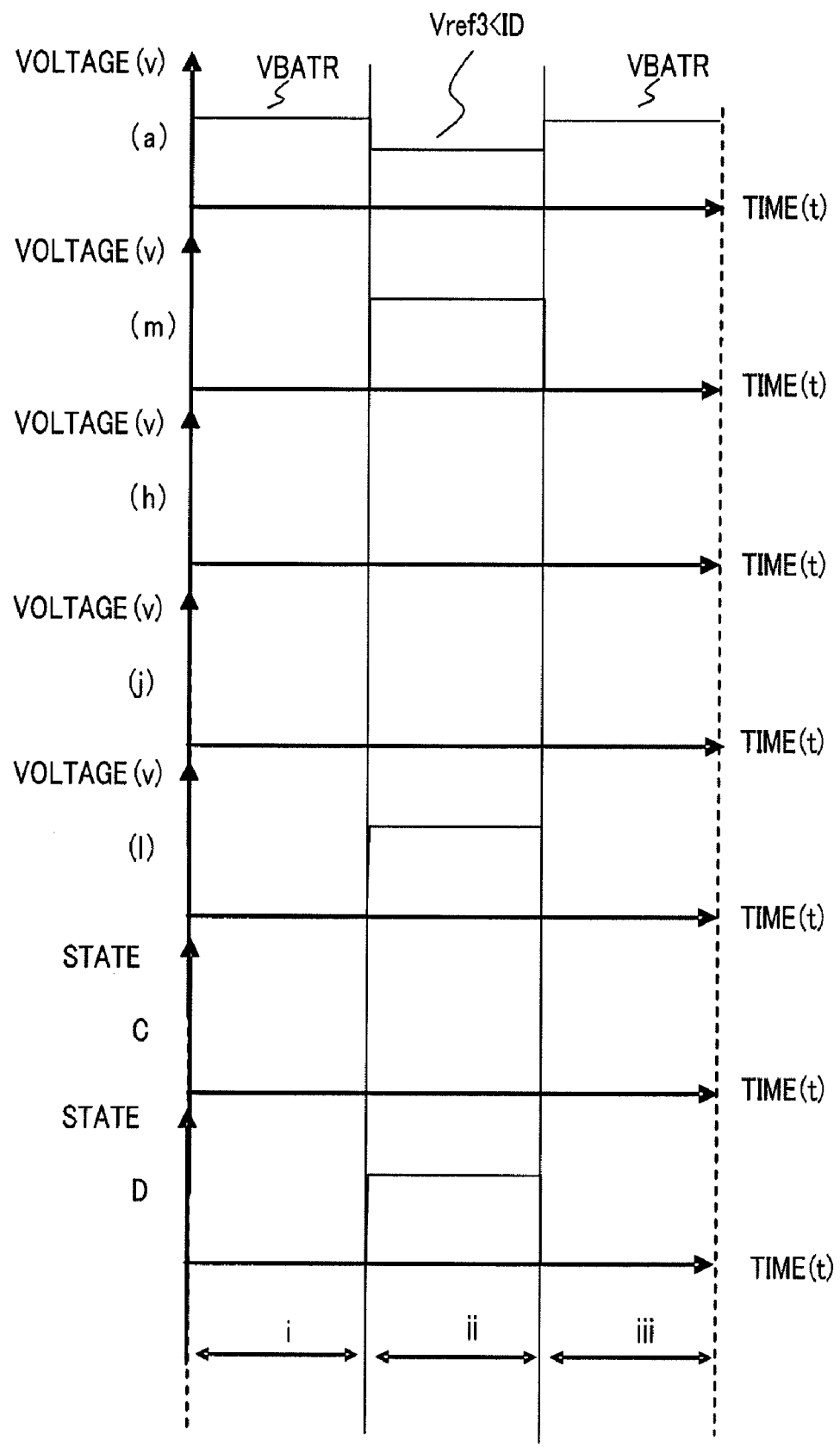
FIG. 16 is a timing diagram showing the operations of the components of the interface detecting circuit according to Embodiment 3.

FIG. 15 and FIG. 16 are timing charts showing the operations of the components of interface detecting circuit 100A. The figures show the timing charts in case where pull-down resistor Rs of peripheral device 300 and pull-up resistor Rd of device 600 are connected by USB cable 400.

FIG. 15 shows a case where pull-down resistor Rs and pull-up resistor Rd of device 600 are connected and the ID voltage satisfies the relationship Vref3<ID voltage<Vref3. Further, the relationship Vref1<Vref2<Vref3 is established.

The ranges (i), (ii) and (iii) in FIG. 15 will be described.

[Range (i) in FIG. 15]

Mini-A receptacle A1 and Mini-A plug A2, and Mini-B receptacle B1 and Mini-B plug B2 are not connected by USB cable 400.

Thus, (a) in FIG. 15 indicates VBATR and the output signal (b) of comparator Comp1, the output signal (e) of comparator Comp2, and the output signal (h) of comparator Comp3 indicate the L level.

Because no voltage is applied to the VBUS terminal of Mini-B receptacle B1, the output signal (m) of comparator Comp4 indicates the L level.

Thus, the filtering outputs (d), (g), (j), (j) and (l) of filter circuits FL1, FL2, FL3 and FL4 indicate the L level by AND circuits AND1, AND2, AND3, AND4 and AND5 and INV1, INV2 and INV3.

Because the filtering outputs (d), (g), (j), (j) and (l) of filter circuits FL1, FL2, FL3 and FL4 indicate the L level, the states A, B, C and D of register 650 also indicate the L level.

[Range (ii) in FIG. 15]

Mini-A receptacle A1 and Mini-A plug A2, and Mini-B receptacle B1 and Mini-B plug B2 are connected by USB cable 400.

In this state, in Mini-B receptacle B1, a voltage is applied to the VBUS terminal from Mini-A receptacle A1 by USB cable 400.

In this case, the ID voltage of Mini-B receptacle B2, which is a connecting point between pull-up resistor Rd of device 600 and pull-down resistor Rs of peripheral device 300 shows the relationship Vref2<ID voltage<Vref3, shown in FIG. 15(a). Further, the relationship Vref1<Vref2<Vref3 holds.

Thus, the output signal (b) of comparator Comp1 and the output signal (e) of comparator Comp2 show the L level.

Because the output signals (b) and (e) of comparators Comp1 and Comp2 show the L level, the logic output (d) of AND circuit AND1 indicates the L level.

The output signal (e) of comparator Comp 2 shows the L level and the output (g) of filter circuit FL2, which is a result of filtering the logic output (f) of AND circuit AND 2 by inverter INV1 and AND circuit AND 2, shows the L level. Further, the output signal (h) of comparator Comp3 and the output signal (m) of comparator Comp4 indicate the H level.

Consequently, by AND circuits AND3, AND4 and AND5 and inverters INV2 and INV3, the filtering output (j) of filter circuit FL3 shows the H level and the filtering output (l) of filter circuit FL4 shows the L level.

As a result, the state A of register section 650 memorizes the L level, the state B memorizes the L level, the state C memorizes the H level and the state D memorizes the L level.

Because the state C of register section 650 shows the H level and the state D shows the L level, the charging current Ichg of charging section 510 becomes a predetermined current amount or less. More specifically, the charging current is 100 mA or less.

[Range (iii) in FIG. 15]

Mini-A receptacle A1 and Mini-A plug A2, and Mini-B receptacle B1 and Mini-B plug B2 are not connected by USB cable 400. Thus, the operation is the same as in (i) in FIG. 15.

FIG. 16 shows a case where pull-down resistor Rs and pull-up resistor Rd of device 600 are connected and the ID voltage satisfies the relationship Vref3<ID voltage. Further, the relationship Vref1<Vref2<Vref3 holds.

The ranges (i), (ii), and (iii) in FIG. 16 will be described.

[Range (i) in FIG. 16]

Mini-A receptacle A1 and Mini-A plug A2, and Mini-B receptacle B1 and Mini-B plug B2 are not connected by USB cable 400.

Thus, (a) in FIG. 16 indicates VBATR and the output signal (b) of comparator Comp1, the output signal (e) of comparator Comp2 and the output signal (h) of comparator Comp3, indicate the L level.

Because no voltage is applied to the VBUS terminal of Mini-B receptacle B1, the output signal (m) of comparator Comp4 indicates the L level.

Thus, the filtering outputs (d), (g), (j), (j) and (l) of filter circuits FL1, FL2, FL3 and FL4 indicate the L level by AND circuits AND1, AND2, AND3, AND4 and AND5 and INV1, INV2 and INV3.

Because the filtering outputs (d), (g), (j), (j) and (l) of filter circuits FL1, FL2, FL3 and FL4 indicate the L level, the states A, B, C and D of register 650 also indicate the L level.

[Range (ii) in FIG. 16]

Mini-A receptacle A1 and Mini-A plug A2, and Mini-B receptacle B1 and Mini-B plug B2 are connected by USB cable 400.

In this state, in Mini-B receptacle B1, a voltage is applied to the VBUS terminal from Mini-A receptacle A1 by USB cable 400.

In this case, the ID voltage of Mini-B receptacle B2, which is a connecting point between pull-up resistor Rd of device 600 and pull-down resistor Rs of peripheral device 300, shows the relationship Vref3<ID voltage, as shown in FIG. 16(a). Further, the relationship Vref1<Vref2<Vref3 holds.

Thus, the output signal (b) of comparator Comp1 and the output signal (e) of comparator Comp2 show the L level.

Because the output signals (b) and (e) of comparators Comp1 and Comp2 show the L level, and the logic output (d) of AND circuit AND1 indicates the L level.

The output signal (h) of comparator Comp3 shows the L level and the output signal (m) of comparator Comp4 shows the H level.

Consequently, the filtering output (j) of filter circuit FL3 shows the L level by AND circuits AND3, AND4 and AND5 and inverters INV2 and INV3, and the filtering output (l) of filter circuit FL4 shows the H level.

As a result, the state A of register section 650 memorizes the L level, the state B memorizes the L level, the state C memorizes the L level and the state D memorizes the H level.

Because the state C of register section 650 shows the L level and the state D shows the H level, the charging current Ichg of charging section 510 becomes a predetermined current amount or more. More specifically, the charging current is 200 mA or more.

[Range (iii) in FIG. 16]

Mini-A receptacle A1 and Mini-A plug A2, and Mini-B receptacle B1 and Mini-B plug B2 are not connected by USB cable 400. Thus, the operation is the same as in (i) in FIG. 16.

According to this embodiment, as described in Embodiment 1, when the state A of register section 650 memorizes the H level and the state B memorizes the L level, device C210 operates and device D220 does not operate. Device C210 is for example, a CODEC device that exchanges audio signal with peripheral device 300 by USB cable 400. Further, when the state A of register 650 memorizes the L level and the state B memorizes the H level, device C210 does not operate and device D220 operates. Device D220 is UART device, which converts serial signals from peripheral device 300 by USB cable 400 to parallel signals and the other way round.

According to this embodiment, device 600 stores logic outputs (d), (g), (j) and (l), which are detection results, into A, B, C and D of resister sections 150, respectively, so as to determine the operation of charging section 510 and the operations of device C210 and device D220. Consequently, effects combining Embodiment 1 and Embodiment 2 are achieved, that is, switching device C210 (CODEC device) and device D220 (UART device) on the device 600 side between operating and not operating and switching the charging operation of charging control circuit CHCL. Consequently, even when many peripheral devices 300 are connected to the USB terminals of device 600, the types of the peripheral devices 300 are detected through USB cable 400 on the device 600 side, thereby allowing adequate operations to be carried out depending on peripheral devices connected, simplifying the USB interface system and reducing software load.

The descriptions provided simply illustrate examples of preferred embodiments of the present invention and the scope of the present invention is not limited to these. For example, although the embodiments concern a case of interface detecting circuit, the same effect can be secured for a case of an interface system or an electronic device using the same.

Although a designation of interface detecting circuit is used in the embodiments, this is used for convenience for the description, and interface system, USB interface, mobile telephone and the like may be used.

Further, the type, the number, and connecting method of the respective circuit sections, for example, detecting section, logic section and filter section are not limited to the embodiments.

INDUSTRIAL APPLICABILITY

The interface detecting circuit and interface detecting method of the present invention are useful in a USB interface detecting circuit mounted in electronic devices such as mobile devices. In particular, they can be applied widely to the interface technology for reducing the number of components, saving space and reducing software load.

What is claimed is:

1. An interface detecting circuit for detecting one of a type and a connecting state of a host on a device side in an interface system, in which a device and the host are connected via a USB cable, wherein
   a pull-down resistor is connected to an ID terminal of a mini-A receptacle of the host; and
   the device comprises:
      a detector that detects a resistance value of the pull-down resistor connected to the ID terminal of the mini-A receptacle of the host; and
      an identifier that identifies the one of the type and the connecting state of the host based on the detected resistance value,
      wherein the detector comprises a comparator that compares a voltage divided by a pull-up resistor connected to a mini-B receptacle of the host and the pull-down resistor connected to the ID terminal of the mini-A receptacle with at least one reference voltage.

2. The interface detecting circuit according to claim 1, wherein the identifier comprises:
   a logic circuit that determines a logic of an output of the detector;
   a filter that cancels noise from a logic output of the logic circuit; and
   a register that stores an output signal of the filter.

3. The interface detecting circuit according to claim 1, wherein
   the device comprises a first device that works in a first function and a second device that works in a second function, and
   the identifier determines whether at least one of the first device and the second device at least one of operates and not operates, based on the identified one of the type and the connecting state of the host.

4. The interface detecting circuit according to claim 1, wherein
   the device comprises a charger that charges a battery, and
   the identifier determines one of an operation and a charging current of the charger based on the identified one of the type and the connecting state of the host.

5. An interface detecting circuit for detecting one of a type and a connecting state of a host on a device side in an interface system, in which the device and the host are connected via a USB cable, wherein
   a pull-down resistor is connected to an ID terminal of a mini-A receptacle of the host; and
   the device comprises:
      a detector that detects a resistance value of the pull-down resistor connected to the ID terminal of the mini-A receptacle of the host; and
      an identifier that identifies the one of the type and the connecting state of the host based on the detected resistance value, wherein
      the identifier comprises:
         a logic circuit that determines a logic of an output of the detector;
         a filter that cancels noise from a logic output of the logic circuit; and
         a register that stores an output signal of the filter.

6. The interface detecting circuit according to claim 5, wherein
   the device comprises a first device that works in a first function and a second device that works in a second function, and
   the identifier determines whether at least one of the first device and the second device at least one of operates and not operates, based on the identified one of the type and the connecting state of the host.

7. The interface detecting circuit according to claim 5, wherein
   the device comprises a charger that charges a battery, and
   the identifier determines one of an operation and a charging current of the charger based on the identified one of the type and the connecting state of the host.

8. An interface detecting device for detecting one of a type and a connecting state of a host in an interface system, in which the interface detecting device and the host are connected via a USB cable, the device comprising:
   a detector that detects a resistance value of a pull-down resistor connected to an ID terminal of a mini-A receptacle of the host; and
   an identifier that identifies the one of the type and the connecting state of the host based on the detected resistance value, wherein
   the detector comprises a comparator that compares a voltage divided by a pull-up resistor connected to a mini-B receptacle of the host and the pull-down resistor connected to the ID terminal of the mini-A receptacle with at least one reference voltage.

9. The interface detecting device according to claim 8, wherein the identifier comprises:
   a logic circuit that determines a logic of an output of the detector;
   a filter that cancels noise from a logic output of the logic circuit; and
   a register that stores an output signal of the filter.

10. The interface detecting device according to claim 8, further comprising:
   a first device that works in a first function; and
   a second device that works in a second function, wherein the identifier determines whether at least one of the first and the second device one of operate and not operate, based on the identified one of the type and the connecting state of the host.

11. The interface detecting device according to claim 8, further comprising:

a charger that charges a battery, wherein
the identifier determines one of an operation and a charging current of the charger based on the identified one of the type and the connecting state of the host.

* * * * *